United States Patent
Blauer et al.

(10) Patent No.: US 11,064,796 B1
(45) Date of Patent: Jul. 20, 2021

(54) GEAR ATTACHMENT SYSTEM

(71) Applicant: Blauer Manufacturing Company, Inc., Boston, MA (US)

(72) Inventors: Stephen J Blauer, Lexington, MA (US); James H Sadler, Huntington, VT (US)

(73) Assignee: Blauer Manufacturing Company, Inc., Boston, MA (US)

( * ) Notice: Subject to any disclaimer, the term of this patent is extended or adjusted under 35 U.S.C. 154(b) by 68 days.

(21) Appl. No.: 16/242,318

(22) Filed: Jan. 8, 2019

Related U.S. Application Data

(60) Provisional application No. 62/615,184, filed on Jan. 9, 2018.

(51) Int. Cl.
*A45F 5/02* (2006.01)
*F16B 2/24* (2006.01)
*F16B 5/06* (2006.01)
*F41C 33/04* (2006.01)

(52) U.S. Cl.
CPC .............. *A45F 5/021* (2013.01); *F16B 2/245* (2013.01); *F16B 5/0642* (2013.01); *F16B 5/0664* (2013.01); *F41C 33/041* (2013.01); *A45F 2200/0566* (2013.01); *A45F 2200/0575* (2013.01); *A45F 2200/0591* (2013.01)

(58) Field of Classification Search
CPC .............. A45F 5/021; A45F 2200/0566; A45F 2200/0575; A45F 2200/0591; A45F 5/02; F16B 2/245; F16B 5/0642; F16B 5/0664; F41C 33/041; Y10T 24/1394
See application file for complete search history.

(56) References Cited

U.S. PATENT DOCUMENTS

| | | | |
|---|---|---|---|
| 2,789,742 A | 4/1957 | De Salvo | |
| 3,512,741 A * | 5/1970 | Goldstein | A47F 8/00 248/206.5 |
| 5,201,858 A | 4/1993 | Otrusina | |
| 5,604,958 A | 2/1997 | Anscher | |
| 5,730,348 A | 3/1998 | Tien | |
| 5,881,933 A | 3/1999 | Rogers | |
| 5,970,588 A | 10/1999 | Hurtz et al. | |
| 5,979,019 A | 11/1999 | Johnson | |
| 7,007,352 B1 | 3/2006 | Hill | |
| 7,762,440 B2 | 7/2010 | Cook | |
| 7,971,762 B2 | 7/2011 | Clifton, Jr. | |
| 8,177,107 B2 * | 5/2012 | Kecskes | A45F 5/02 224/197 |
| 8,827,127 B2 * | 9/2014 | Rekuc | A45C 15/00 224/183 |

(Continued)

*Primary Examiner* — Victor D Batson
*Assistant Examiner* — Matthew J Sullivan
(74) *Attorney, Agent, or Firm* — Altman & Martin; Steven K Martin

(57) ABSTRACT

A system includes knobs on an item of gear and a latch attached to a carrier. Each knob has a neck and a head with a larger diameter. First and second sliders fit into a latch frame. Hooks on the sliders form expandable apertures. To attach, the knob is pushed against the slider hooks to expand the aperture. After the head passes through the aperture, a spring biases the hooks together so the aperture width is smaller than the head diameter, capturing the knob. A carrier adapter adapts the latch to a carrier. Adapters are available for duty belts, MOLLE-equipped carriers, and horizontal slots.

24 Claims, 25 Drawing Sheets

(56) References Cited

U.S. PATENT DOCUMENTS

| | | | |
|---|---|---|---|
| 9,101,198 B2 * | 8/2015 | Tseng | F41C 33/041 |
| 9,451,821 B1 | 9/2016 | Estigoy | |
| 10,466,011 B2 * | 11/2019 | Swan | A45F 5/021 |
| 2005/0115999 A1 * | 6/2005 | Johnson | A45F 5/004 |
| | | | 224/269 |
| 2006/0101627 A1 | 5/2006 | Ida | |
| 2010/0294822 A1 | 11/2010 | Haight | |
| 2011/0036880 A1 * | 2/2011 | Lee | A45F 5/00 |
| | | | 224/269 |
| 2012/0198602 A1 | 8/2012 | Mongan et al. | |
| 2013/0254976 A1 | 10/2013 | Aravena | |
| 2016/0066680 A1 * | 3/2016 | Hazeltine | A45F 5/021 |
| | | | 224/676 |
| 2017/0097217 A1 * | 4/2017 | Evans | F42B 39/02 |
| 2017/0155415 A1 * | 6/2017 | Yan | A45F 5/021 |
| 2019/0223582 A1 * | 7/2019 | DiPierro | A45F 5/021 |
| 2019/0246777 A1 * | 8/2019 | Eynav | A45F 5/14 |

\* cited by examiner

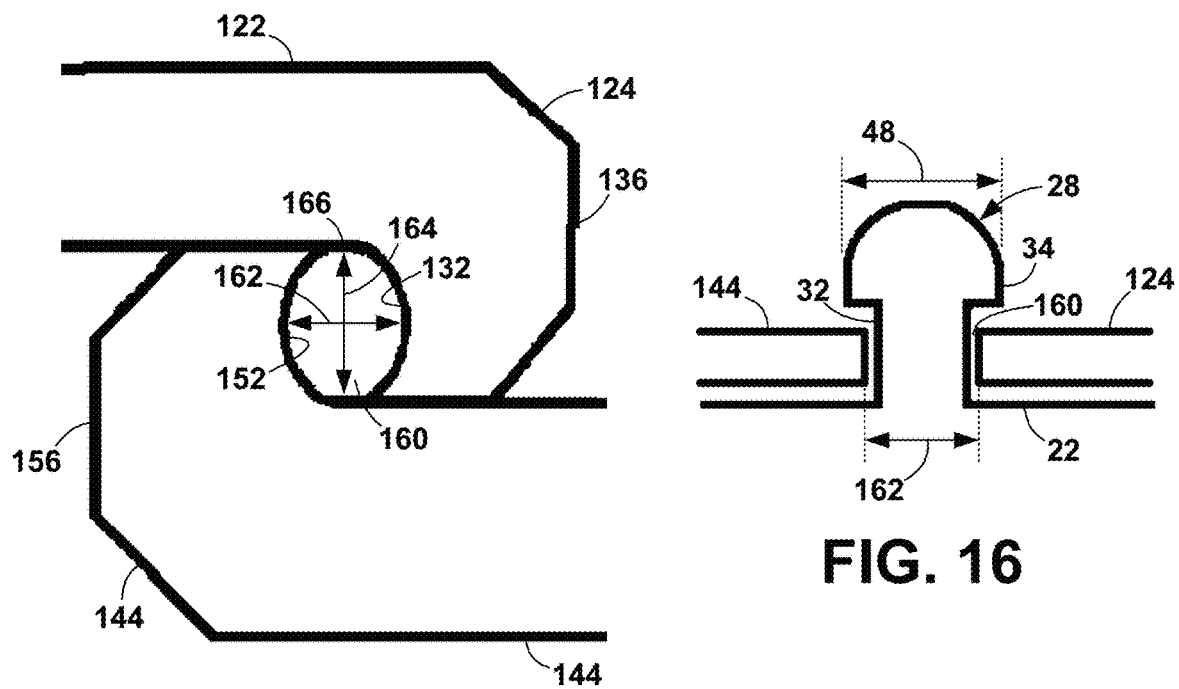
FIG. 15
FIG. 16
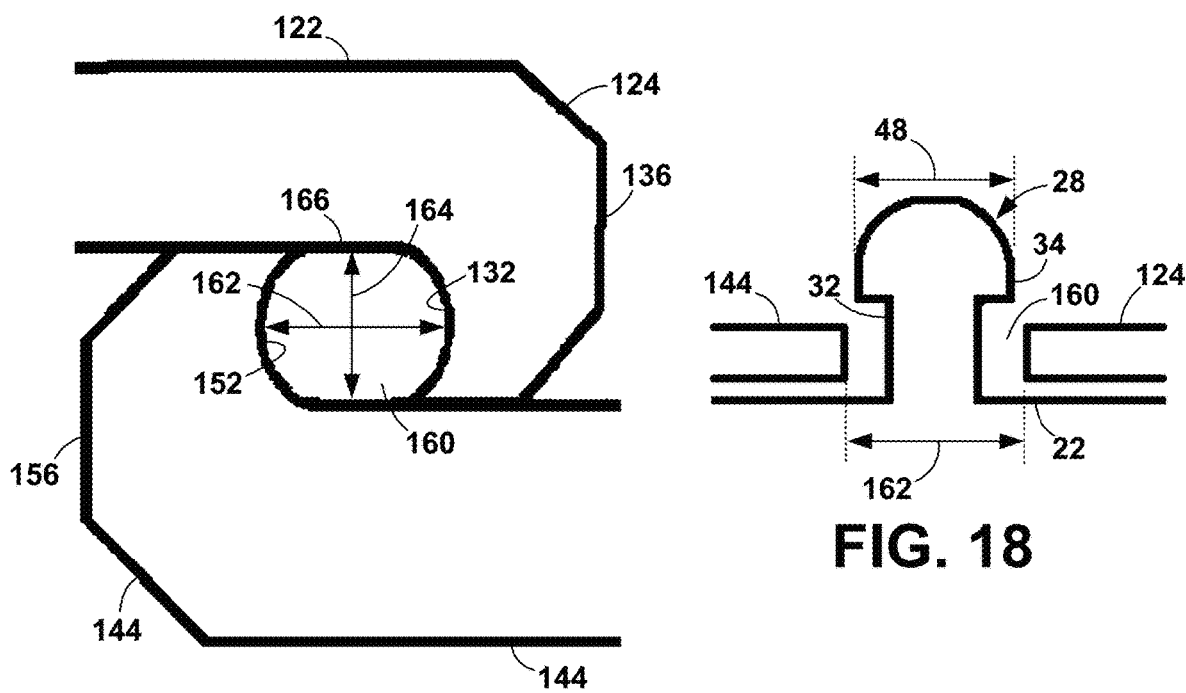
FIG. 17
FIG. 18

GEAR ATTACHMENT SYSTEM

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to duty belt gear, more particularly, to systems for attaching gear to duty belts and other gear carriers.

2. Description of the Related Art

Typical duty belts worn by police officers are made from leather or nylon webbing in layers with plastics, adhesives, and PU leathers, for support and durability. The belts are 2.25 inches wide and 0.25 inches thick and support the full weight (up to 30 pounds) of duty gear used by a police officer. Duty belts are too wide to be threaded through trouser belt loops, so they are either fastened to the waist using special keeper belts and belt keepers (1-inch-wide leather or synthetic straps with heavy duty snaps), or by using hook and loop tape on the back of the duty belt which mates to hook or loop keeper belts. The keeper belts are threaded through the trouser loops. Either combination prevents the officer's belt from being rotated around his waist, for example, in a struggle.

The duty gear items such as weapon, non-lethal weapon (Taser), radio, hand cuff case, mag pouches, pepper spray pouch, baton pouch, and so on, are made from leather or synthetic materials and are either sewn or molded into the shape of the items. The individual duty gear items typically slide onto the duty belt in the order that the officer wants them to be positioned on the waist, beginning from the left side of the wearer's body to the right side. The loaded belt is then placed over the keeper belt and engaged with separate keepers or stuck to the hook or loop tape.

The items typically fit tight but can still slide during the shift, with the exception of the weapon or radio holsters, which can sometimes be fixed in place. Hook and loop fasteners can help prevent items from sliding, as do keepers, but only until they engage with the next fixed belt loop. During the shift, the only way an officer can move the gear on or off of the duty belt is to remove the item from its protective case or pouch or remove the entire belt and take all of the other items off until the desired item is reached and then put the desired items back on.

BRIEF SUMMARY OF THE INVENTION

The present invention is a system for quickly adding and removing items of gear from a duty belt or other carrier, such as a vest equipped with a Modular Lightweight Load-carrying Equipment (MOLLE) system or a shirt/jacket equipped with slots. The system includes knobs attached to the gear item, a latch that attaches to the carrier, an optional carrier adapter that adapts the latch to the carrier, and an optional plate that attaches the knobs to the item.

The knobs are attached directly or indirectly to the item of gear. The knob is directly attached when the knob is physically attached to the gear item. The knob is indirectly attached to the item of gear when an intermediary component, such as a rigid, flat plate, is between the knob and item of gear. A knob has a neck extending from the plate and a head attached to the neck. The head has a larger diameter than that of the neck.

The latch has a frame, a first slider, a second slider, a biasing mechanism which is typically a coil spring, and an optional cover. The frame has a bore extending into the frame for each knob.

The first slider and second slider are thin and flat. Each has a center bar extending in the Y direction with a pair of arms extending perpendicularly in the X direction from the inner edge to an end. The end of each arm curves between 90° and 180° to form hooks. On the first slider, the hooks curve toward each other, and on the second slider, the hooks curve away from each other. The edge of the center bar opposite the arms is the squeeze edge. At the center of the center bar on inner edge is a spring wall that extends in the Y and Z directions.

The sliders slidably fit into a slider depression in the frame such that the concave edges of a hook from each slider form the rim of an aperture that is axially aligned with a knob bore. The spring sits between and pushes against the spring walls of the sliders to bias the sliders away from each other to the latched position. In the latched position, the aperture width is smaller than the diameter of the knob head so that the knob is captured by the aperture. When inward pressure is applied to the slider squeeze edges, the sliders move toward each other against the spring bias to the unlatched position. In the unlatched position, the aperture width is larger than the diameter of the knob head so the knob can pass through the aperture. When the pressure is released, the spring returns the latch to the latched position.

To attach the gear item to the latch, the knobs are pushed against the slider hooks to force the hooks apart against the spring to the unlatched position. After the knob heads pass through the apertures, the spring biases the sliders back to the latched position, where the width of the apertures is smaller than the diameter of the knob heads and the aperture rims surround the knob necks, thereby capturing the knobs.

To remove the gear item, the squeeze edges are squeezed together, causing the apertures to widen. When large enough, the knobs are pulled from the apertures.

The device of the present invention can be made with two or more holes in the X-direction by additional hooks extending from the arms to form additional apertures. Furthermore, the device can be made with holes only in the X-direction. A pair of mirror image first and second sliders with a single arm having a pair of hooks extends from the center bar.

Likewise, the gear item can have knobs in only the X direction, the Y direction, or both. The number of knobs will typically depend on the size and weight of the gear item.

Optionally, a swivel can be installed between the plate/item and the knobs. The swivel has a base that is attached to the gear item/plate and a rotator from which the knobs extend. The base and rotator are attached together by an axle on which the rotator rotates.

A carrier adapter attached to the latch adapts the latch to a carrier. A carrier adapter for a duty belt has a belt channel attached to the latch frame. Set screws secure the latch at the desired position on the duty belt. Another carrier adapter for a duty belt has a folded-over clip that clips onto the duty belt. A wire hasp secures the latch to the duty belt.

A carrier adapter for a MOLLE-equipped carrier has one or more folded-over hooks at its top edge that hook into the MOLLE loops. A pair of tabs extending downwardly fit into the MOLLE loops below the hooks.

A carrier adapter for attaching to a horizontal slot has a folded-over clip. The clip slides into the slot and is held there by the clip pressing against the latch.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein:

FIG. 15 is an enlarged view of the aperture in the latched position;

FIG. 16 is an enlarged, cross-sectional view of the aperture and knob in the latched position;

FIG. 17 is an enlarged view of the aperture in the unlatched position;

FIG. 18 is an enlarged, cross-sectional view of the aperture and knob in the unlatched position;

DETAILED DESCRIPTION OF THE INVENTION

Figure 1:
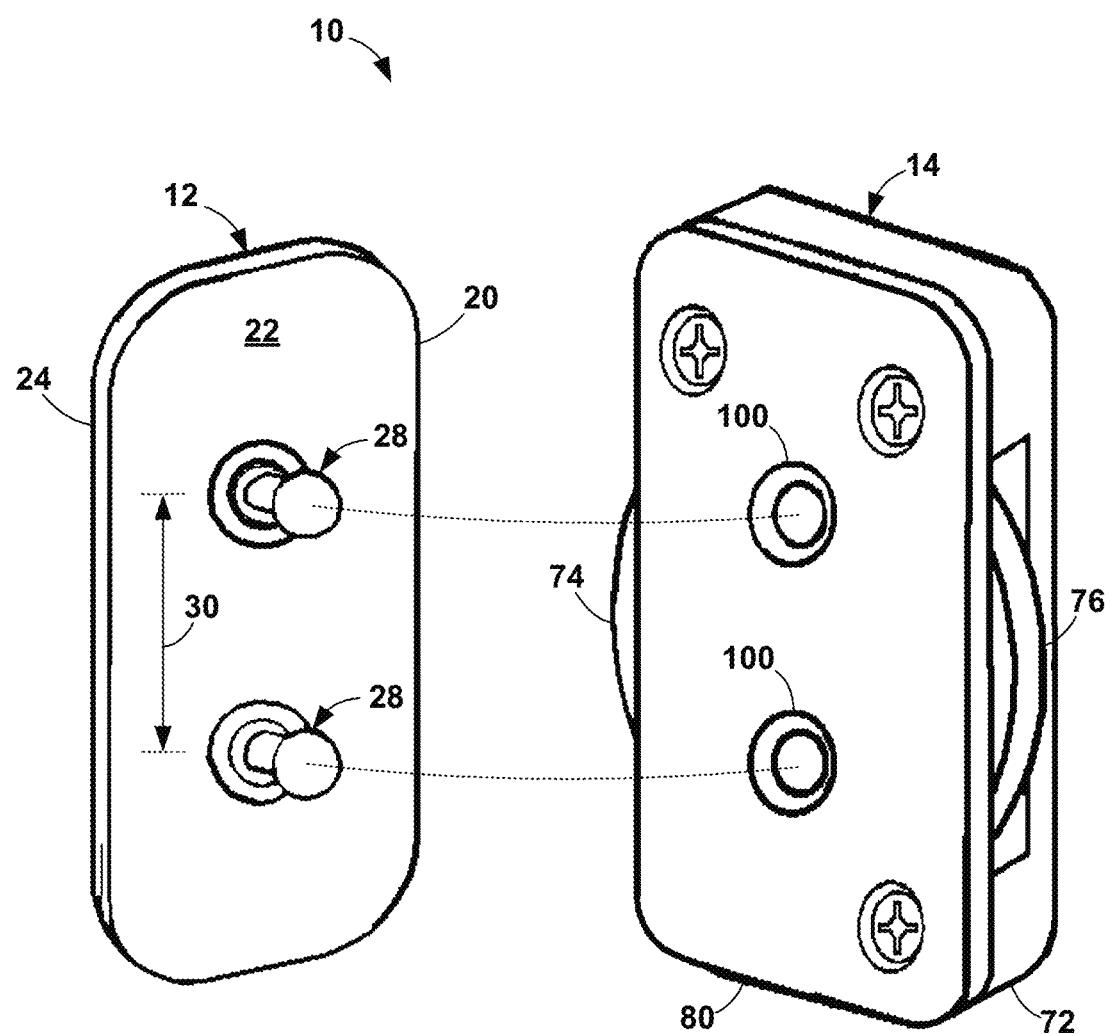
FIG. 1 is an isometric view of the system of the present invention.

The present application hereby incorporates by reference in its entirety U.S. Provisional Patent Application No. 62/615,184, on which this application is based.

The present invention is a system for quickly adding and removing items of gear from a duty belt or other carrier, such as a vest equipped with a Modular Lightweight Load-carrying Equipment (MOLLE) system or a shirt/jacket equipped with slots.

The system of the present invention allows the wearer to set up the duty belt in such a way that the items are either fixed to or slidable on the duty belt. Items can be made slidable for when, for example, the officer is driving to allow items to be moved from the small of the back around to the side.

The system allows the officer to add or remove items easily during the shift. For example, a Taser might be useful for certain calls but may be left in the car for others. The officer can simply snap the pouch, case, or holster on and squeeze it off the belt during the shift as often as needed. At the end of the shift, the officer can, for example, remove just the weapon and holster from the belt and store them away for safekeeping.

The system also allows duty gear to be moved from the belt to a MOLLE-equipped vest during the shift. This can be useful, for example, when driving, allowing the officer to temporarily move gear from the rear of the belt, where it interferes with comfort, to the vest.

The system also allows other items of gear to be easily movable during the shift. This can be useful, for example, to move a badge from a shirt to a jacket.

The system 10 of the present invention includes knobs 28 attached to the gear item 2, a latch 14 that attaches to the carrier 4, an optional carrier adapter 16 that adapts the latch 14 to a carrier 4, and an optional plate 20 that attaches the knobs 28 to the item 2. The term "carrier" is used as a general term to denote a duty belt, vest, backpack, bag, shirt, or any other article to which a gear item 2 can be attached.

Figure 27:
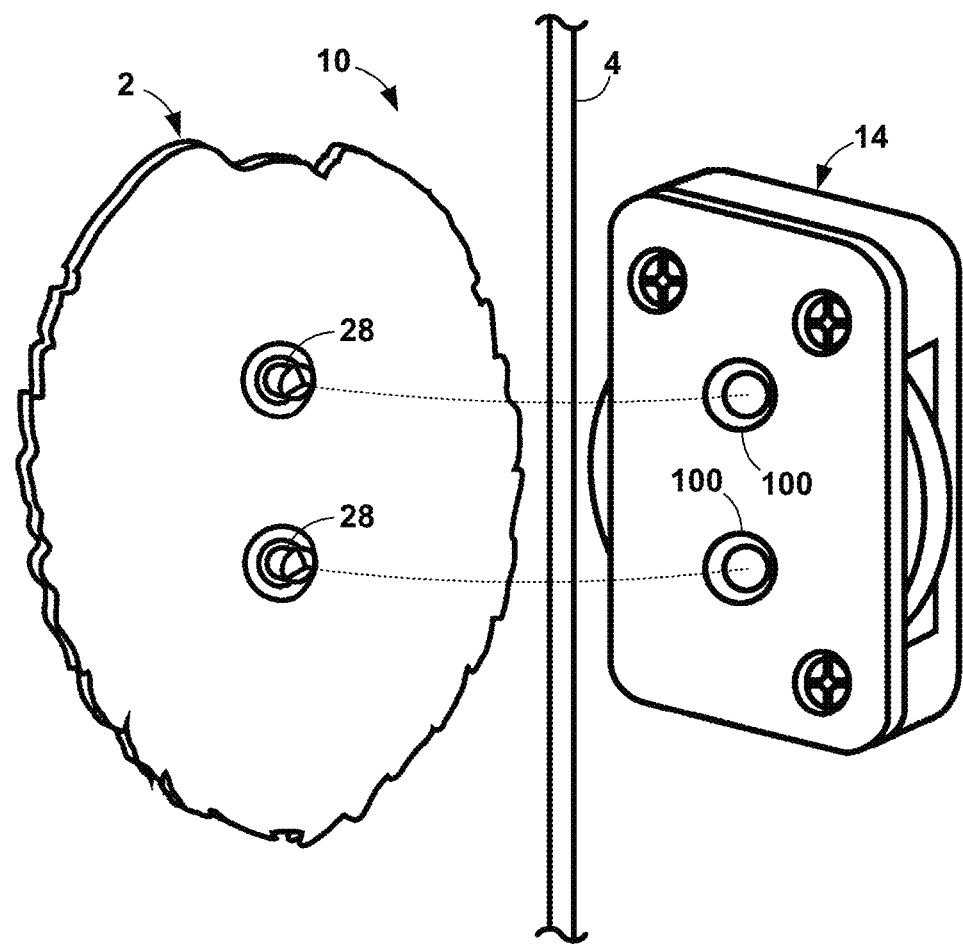
FIG. 27 is an isometric view of the apparatus with the knobs attached directly to the gear item.

The knobs 28 are attached directly or indirectly to the item of gear. The knob 28 is directly attached when the knob 28 is physically attached to the gear item 2, as in FIG. 27, which shows the knobs 28 attached to a badge 2.

The knob 28 is indirectly attached to the item of gear when an intermediary component is between the knob 28 and item of gear. In most cases, a plate 20 is the intermediary component, as shown in FIG. 1. Except where specifically described, the remainder of the present specification assumes that the knobs 28 are attached to a plate 20. The assemblage of plate 20 and knobs 28 is referred to as a panel 12.

As shown in FIGS. 2-5, each of the knobs 28 has a neck 32 extending perpendicularly, either directly or indirectly, from the front surface 22 of the plate 20 and a head 34 attached to the end of the neck 32. The neck 32 has a round cross section and can be cylindrical, as in FIG. 2, or conical, as in FIG. 3. A conical neck is conical at the front surface 22, as at 36, and cylindrical at the head 34, as at 38. The length 40 of the neck 32 is described below.

The head 34 has a round cross section and has a larger diameter 48 than that of the neck 32 at the junction of the head 34 and neck 32. Optionally, the head 34 is tapered, as at 44, such that its diameter is smaller at the tip 46 than at the neck 32. The shape of the taper 44 can be round, as in FIG. 2, or conical, as in FIG. 3, or any other appropriate shape.

Figure 2:
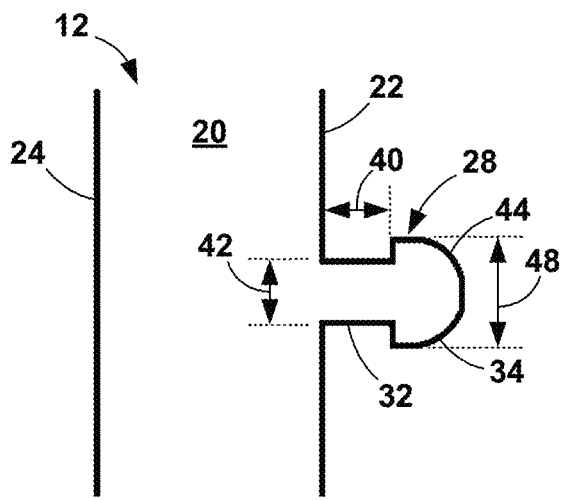
FIG. 2 is a side view of a knob with several characteristics.
Figure 3:
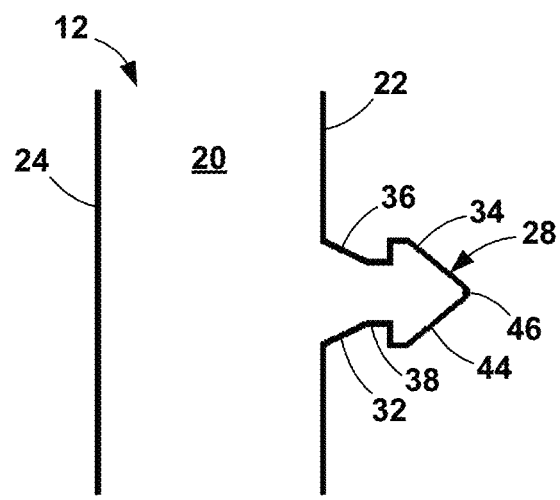
FIG. 3 is a side view of a knob with several characteristics.
Figure 4:
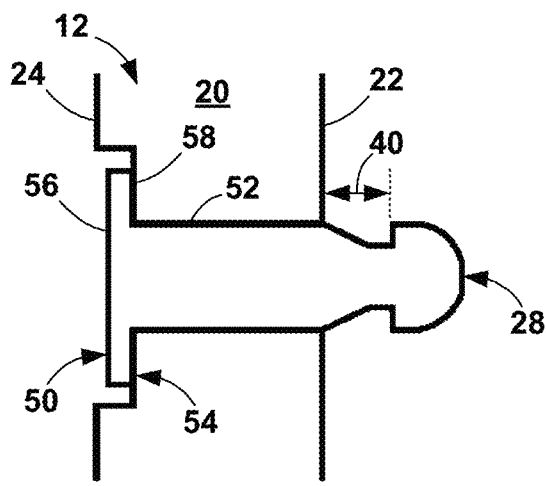
FIG. 4 is a side view of another knob attachment to the plate.
Figure 5:
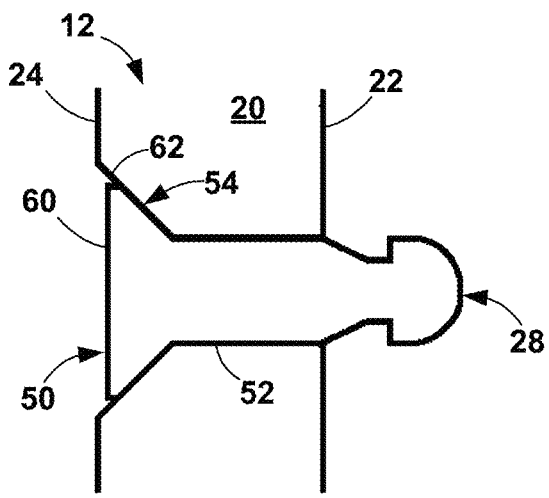
FIG. 5 is a side view of another knob attachment to the plate.

The present invention contemplates that any method of attaching the knob 28 to the plate 20 can be employed. In FIGS. 2 and 3, the knob 28 is formed as part of the plate 20, for example, by molding or machining the knobs 28 with the plate 20. In FIGS. 4 and 5, the knob 28 is at the end of a stud 50 that extends through a hole 52 in the plate 20. The stud 50 includes a stop 54 to retain the knob 28 in the correct position. In FIG. 4, the stop 54 is a disk 56 that fits into a countersunk hole 58 in the back surface 24 of the plate 20. In FIG. 5, the stop 54 is a conical section 60 in a countersunk hole 62. The present invention contemplates that any form of stop 54 that secures the knob 28 in the correct position can be used.

The present invention contemplates that the stud 50 can be secured in the hole 52 by any adequate means. Methods include, but are not limited to, adhesives, welding, soldering, and press fit.

A stud 50 that is assembled to the plate 20 has the advantage that the stud 50 and plate 20 can be composed of different materials. For example, the plate 20 can be composed of an aluminum alloy or plastic for low weight and the stud 50 can be composed of stainless steel for strength.

The latch 14 is shown in FIGS. 6-17. The latch 14 includes a frame 72, a first slider 74, a second slider 76, a biasing mechanism 78 which is typically a coil spring 86, and an optional cover 80. The latch 14 has an X direction that is horizontal in FIGS. 6 and 7, a Y direction that is vertical in FIGS. 6-8, and a Z direction that is horizontal in FIG. 8.

Figure 9:
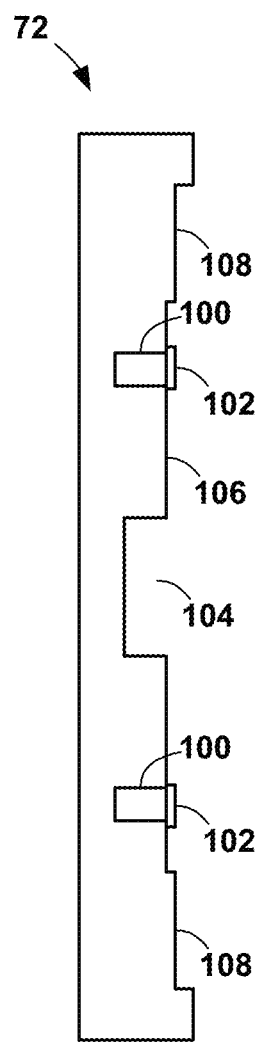
FIG. 9 is a side view of the latch frame.
Figure 10:
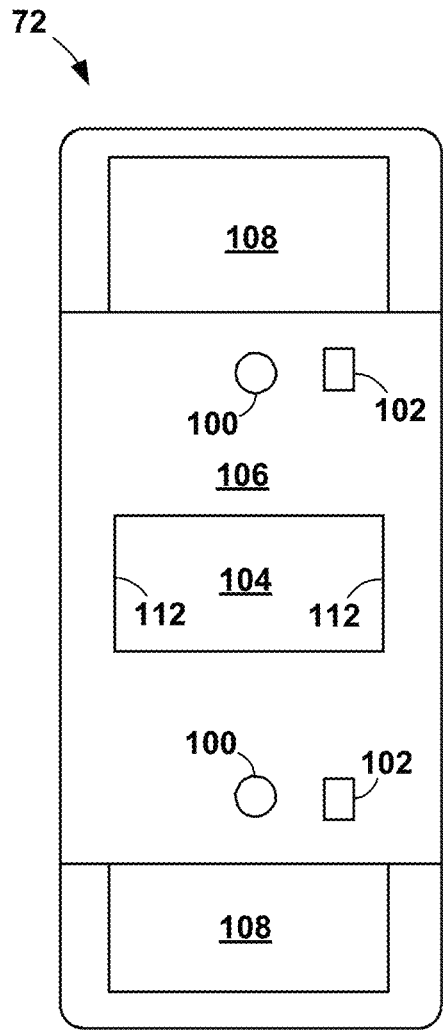
FIG. 10 is a front view of the latch frame.

The frame 72 is shown in detail in FIGS. 9 and 10. The frame 72 has a bore 100 for each knob 28. The bores 100 extend into the frame 72 in the Z direction and are aligned in the Y direction. One or more optional slider stops 102 extend away from the frame 72 in the Z direction. Between the bores 100 is a spring slot 104, which is a deep depression in the Z direction in the frame 72 that extends in the X direction. The bores 100, slider stops 102, and spring slot 104 are within the area of a slider depression 106, a shallow depression in the Z direction in the frame 72 that extends the full X dimension of the frame 72 and a short distance beyond the bores 100 in the Y direction. A cover depression 108 within the boundaries of the frame 72 is shallower in the Z direction than the slider depression 106. The cover depression 108 is shorter in the X direction and longer in the Y direction. Each of these frame elements is discussed in detail below.

The first slider 74, second slider 76, and spring 86 are shown in FIGS. 11-14. The sliders 74, 76 are thin and flat.

Figure 11:
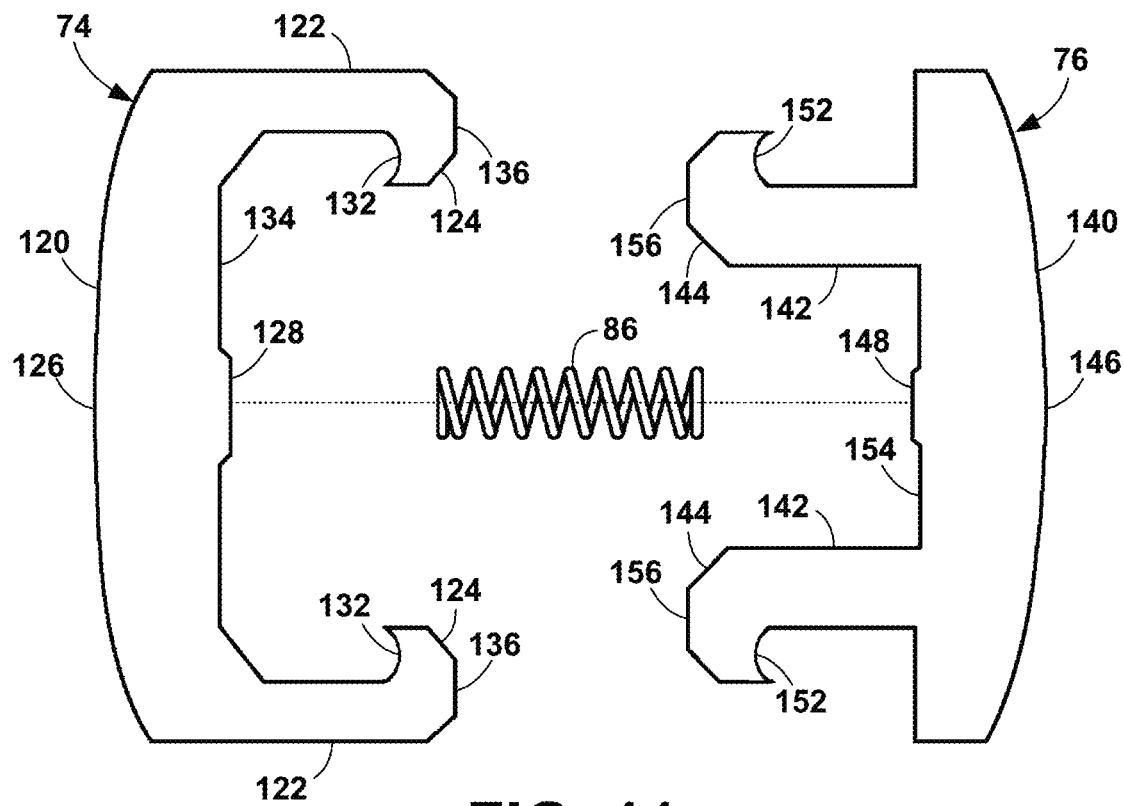
FIG. 11 is a front view of the latch sliders and spring.
Figure 12:
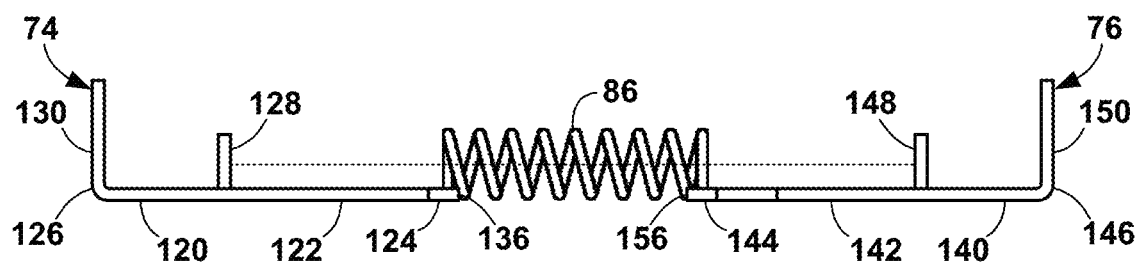
FIG. 12 is a top view of the latch sliders and spring.

In FIG. 11, the first slider 74 has a center bar 120 extending in the Y direction with a pair of arms 122 extending perpendicularly in the X direction from the inner edge 134 to an end 136. The end 136 of each arm 122 curves toward the other arm between approximately 90° and approximately 180° to form hooks 124. The edge of the center bar 120 opposite the arms 122 is the squeeze edge 126. Optionally, a squeeze tab 130 that widens the squeeze edge 126 for comfort can be formed at the squeeze edge 126 typically by bending a short extension of the center bar 120 90° in the Z direction, as in FIG. 12. At the center of the center bar 120 on inner edge 134 is a spring wall 128 that extends in the Y and Z directions. The spring wall 128 is formed typically by bending a tab 90° in the Z direction.

In FIG. 11, the second slider 76 has a center bar 140 extending in the Y direction with a pair of arms 142 extending perpendicularly in the X direction from the inner edge 154 to an end 156. The end 156 of each arm 142 curves away the other arm between approximately 90° and approximately 180° to form hooks 144. The edge of the center bar 140 opposite the arms 142 is the squeeze edge 146. Optionally, a squeeze tab 150 that widens the squeeze edge 146 for comfort can be formed at the squeeze edge 146 typically by bending a short extension of the center bar 140 90° in the Z direction, as in FIG. 12. At the center of the center bar 140 on the inner edge 154 is a spring wall 148 that extends in the Y and Z directions. The spring wall 148 is typically formed by bending a tab 90° in the Z direction.

Figure 13:
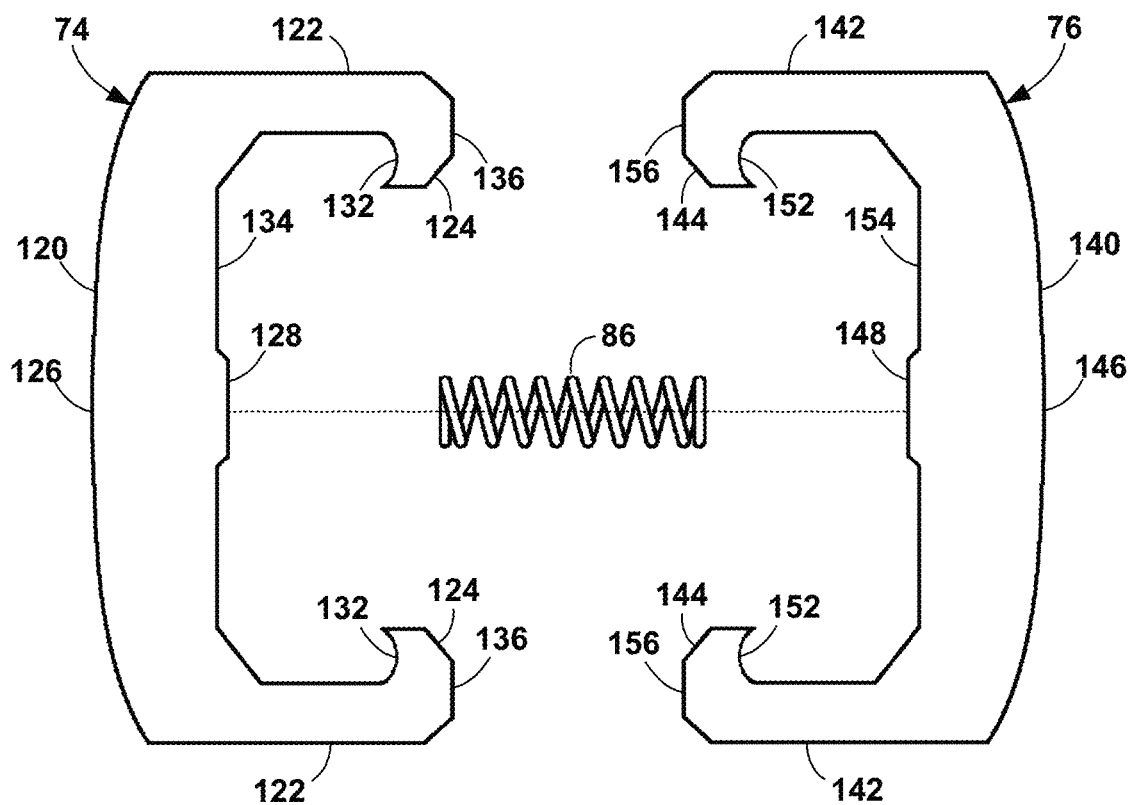
FIG. 13 is a front view of another configuration of the latch sliders and spring.
Figure 14:
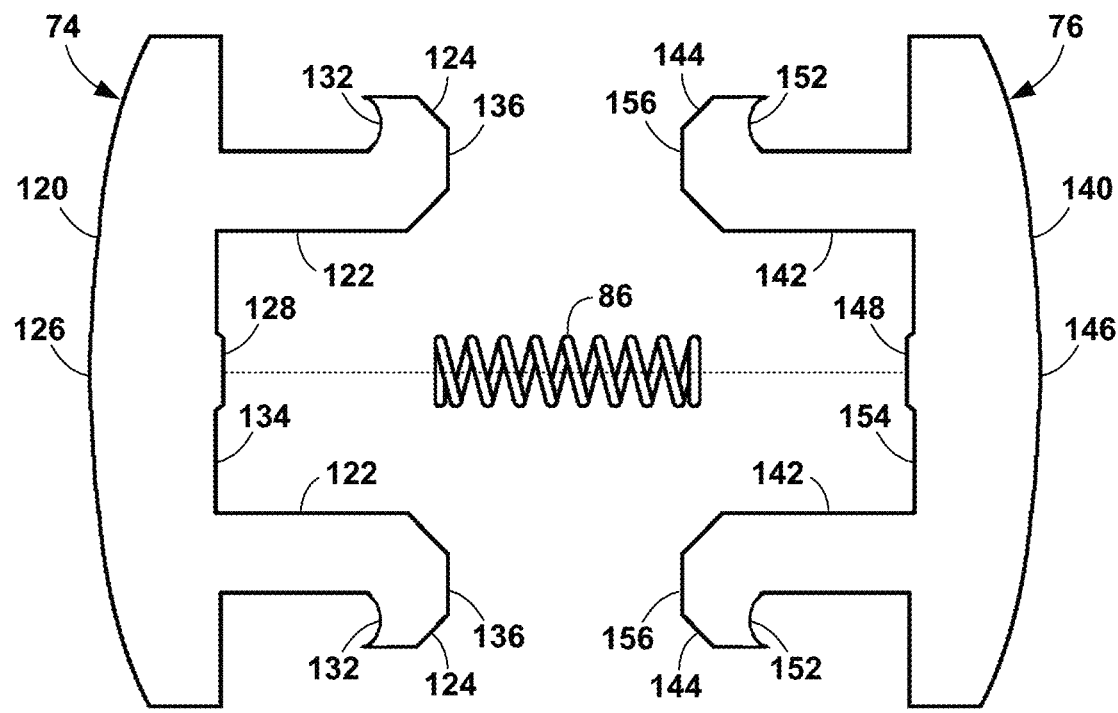
FIG. 14 is a front view of another configuration of the latch sliders and spring.

Although most of the figures show the slider configuration of FIG. 11, alternate configurations of the sliders 74, 76 can be employed. In FIG. 13, both sliders 74, 76 have hooks 124, 144 that curve toward each other. In FIG. 14, both sliders 74, 76 have hooks 124, 144 that curve away from each other.

Figure 6:
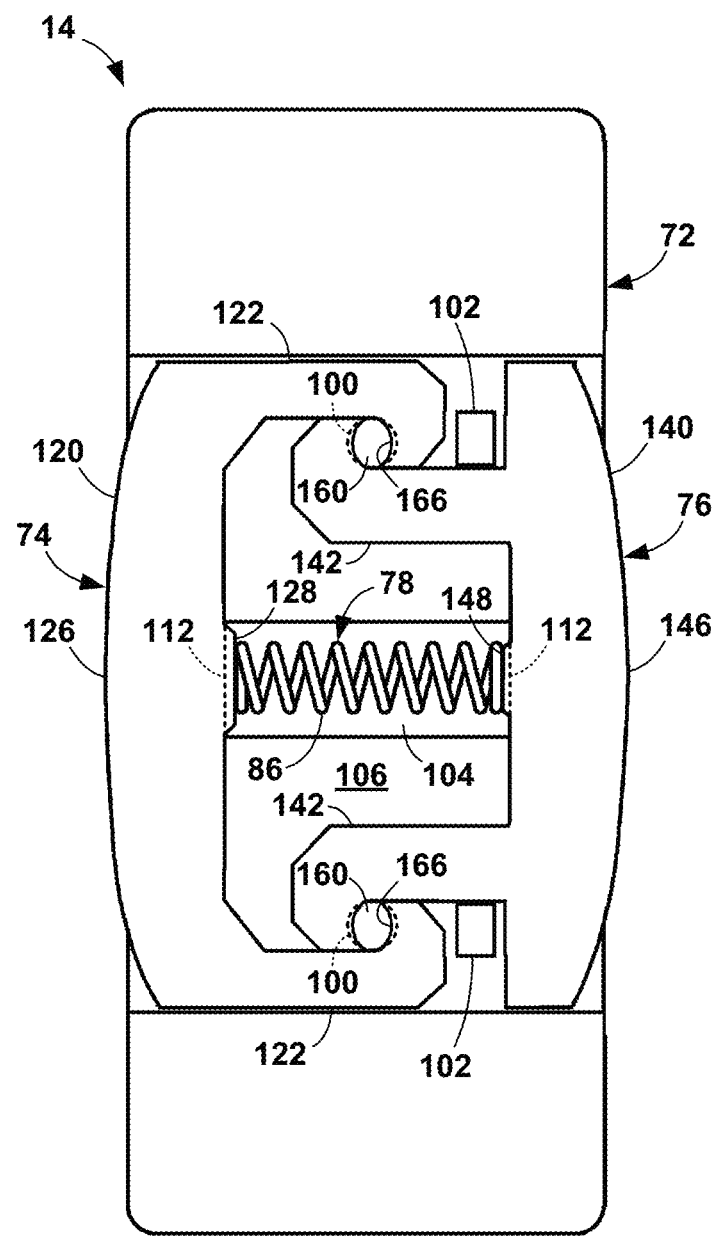
FIG. 6 is a front view of the latch without the cover in the latched position.
Figure 7:
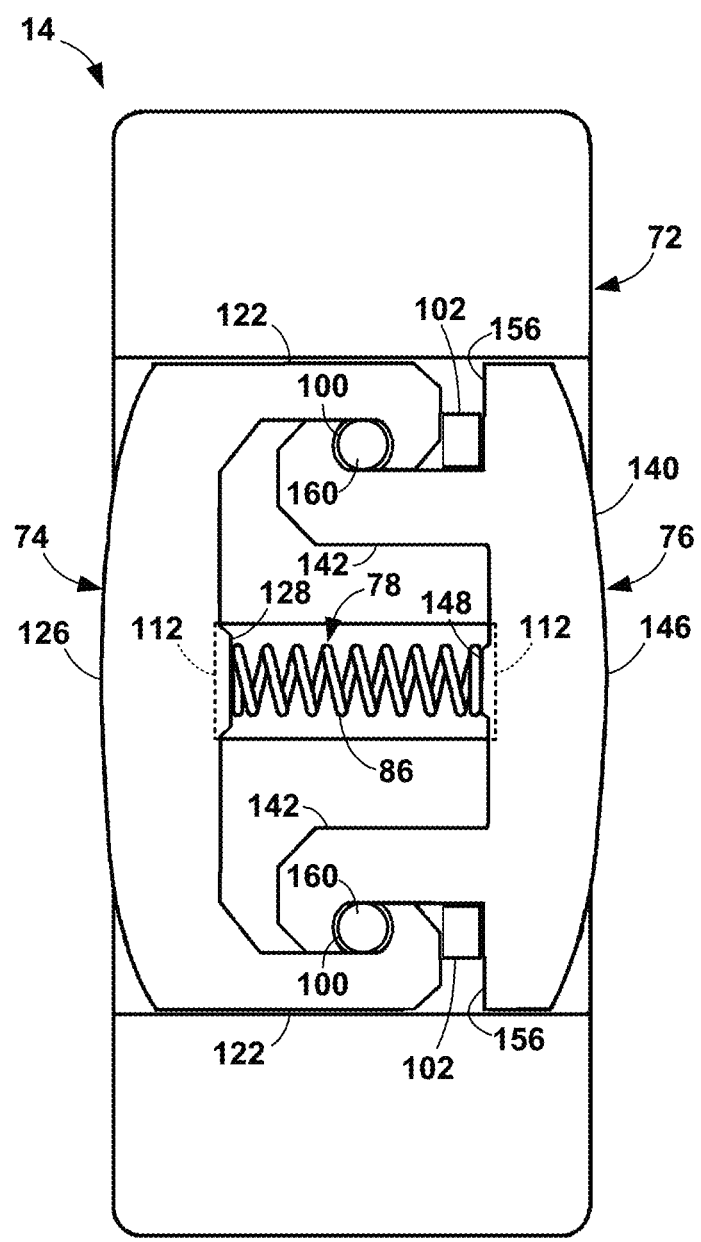
FIG. 7 is a front view of the latch without the cover in the unlatched position.
Figure 8:
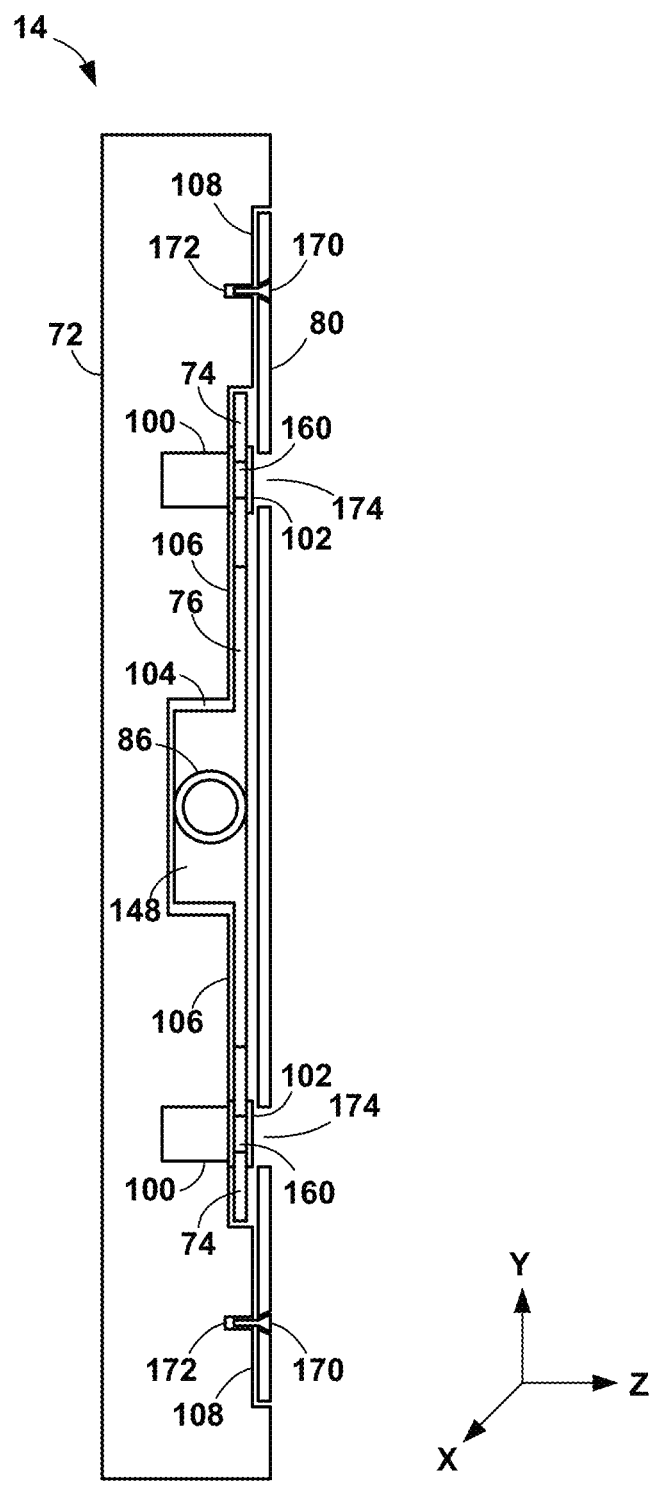
FIG. 8 is a side, cross-sectional view of the latch.

The sliders 74, 76 slidably fit into the slider depression 106 in the frame 72, as in FIGS. 6-8. With the slider configuration of FIG. 11, the sliders 74, 76 do not overlap each other, so that the slider depression 106 has a depth that is the thickness of one slider 74, 76. With the configurations of FIGS. 13 and 14, the sliders 74, 76 overlap, so that the slider depression 106 has a depth that is the sum of the thicknesses of both sliders 74, 76.

The spring walls 128, 148 fit into the spring slot 104. The spring 86 resides in the spring slot 104 and pushes against the spring walls 128, 148 to bias the sliders 74, 76 away from each other. The spring walls 128, 148 abut the ends 112 of the spring slot 104 to limit the outward travel of the sliders 74, 76. When the spring walls 128, 148 abut the ends 112 of the spring slot 104, the latch 14 is in the latched position, as in FIG. 6.

In the configuration of the present invention described herein, the biasing mechanism 78 is a coil spring 86. The present invention contemplates that any form of biasing mechanism can be used. Examples include, but are not limited to, leaf spring(s) between or outside of the sliders 74, 76, coil spring(s) outside of the sliders 74, 76, and spring tabs integral with the sliders 74, 76.

When in the latched position, shown in FIGS. 6, 15, and 16, the concave edges 132, 152 of the hooks 124, 144 form the rims 166 of apertures 160 that are axially aligned with the knob bores 100. The parameters of the apertures 160 are explained below.

When inward pressure is applied to the squeeze edges 126, 146 of the sliders 74, 76, the sliders 74, 76 move toward each other as the bias of the spring 86 is overcome. The inward motion is limited by the inner edge 154 of the center bar 140 of the second slider 76 hitting the slider stops 102 and/or the ends of the first slider arms 122 hitting the slider stops 102, as in FIG. 7. When this occurs, the latch 14 is in the unlatched position, as in FIGS. 7, 17, and 18. When in the unlatched position, the apertures 160 are enlarged in the X direction.

When the pressure is released, the spring 86 returns the latch 14 to the latched position shown in FIGS. 6, 15, and 16.

In the latched position, shown in FIGS. 15 and 16, the width 162 of the aperture 160 in the X dimension is smaller than the diameter 48 of the knob head 34 so that the knob head 34 cannot pass through the aperture 160. In the unlatched position, shown in FIGS. 17 and 18, the width 162 of the aperture 160 is larger than the diameter 48 of the knob head 34 so that the knob head 34 can pass through the aperture 160. In both the latched and unlatched position, the height 164 of the apertures 160 in the Y dimension is larger than the diameter 48 of the knob head 34.

Figure 19:
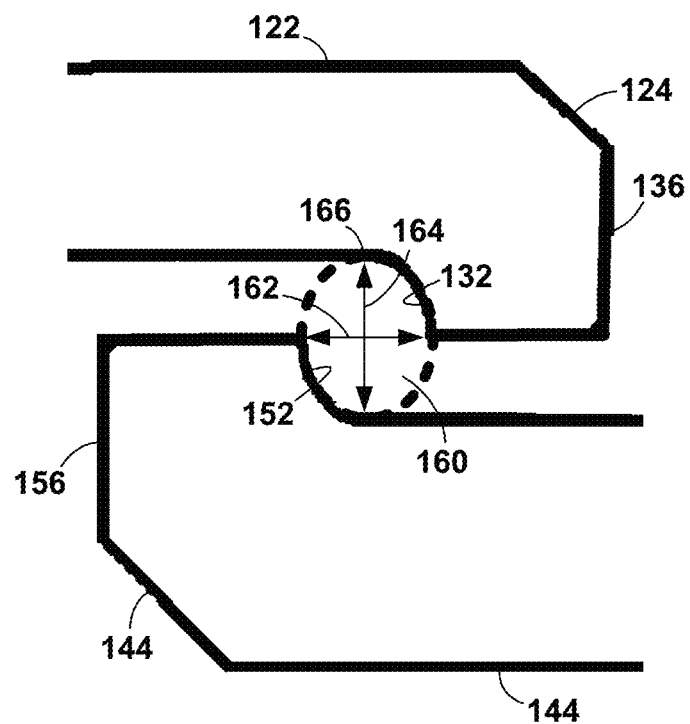
FIG. 19 is an enlarged view of an alternative configuration of the aperture in the unlatched position.

FIGS. 15 and 17 show an aperture 160 formed by concave edges 132, 152 of the hooks 124, 144 that extend over approximately 180° so that the rim 166 is whole, that is, without a break. FIG. 19 shows an alternative configuration where the hooks 124, 144 extend over approximately 90° so that the rim 166 that forms the aperture 160, shown as a dashed line, is not whole. This configuration still works because the width 162 of the aperture 160 is still smaller than the diameter 48 of the knob head 34 when in the latched position.

As shown in FIG. 8, the cover 80 fits in the cover depression 108 and is secured, typically by screws 170 in threaded holes 172. The cover 80 secures the spring 86 in the spring slot 104 and the sliders 74, 76 in the slider depression 106. The cover 80 also protects the mechanism of the latch 14 from ambient conditions and impacts.

The cover 80 has holes 174 that are axially aligned with the apertures 160 and knob bores 100.

To attach the panel 12 to the latch 14, the knobs 28 are inserted into the holes 174 in the cover 80 until they contact the aperture rim 166. By further pushing the knobs 28, the head taper 44 forces the hooks 124, 144 apart against the spring 86 and the sliders 74, 76 toward each other to the unlatched position, where the apertures 160 are large enough to allow the knob heads 34 to pass through. When the plate 20 abuts the cover 80 and the heads 34 pass completely through the apertures 160, the spring 86 biases the sliders 74, 76 back to the latched position, where the width 162 of the apertures 160 is smaller than the diameter 48 of the knob heads 34 and the aperture rims 166 surround the knob necks 32, thereby capturing the knobs 28.

The length 40 of the neck 32 must be long enough to extend through the cover hole 174 and the aperture 160 when the plate 20 is against the cover 80. If the neck 32 is too long, there will be too much play in the attachment. Consequently, the neck 32 should be only slightly longer than necessary to extend through the cover hole 174 and the aperture 160. Then the panel 12 will be held tightly against the latch 14 with little or no play.

The panel 12 is removed from the latch 14 by squeezing the squeeze edges 126, 146 together, which causes the hooks 124, 144 to separate, thereby enlarging the apertures 160 in the X direction on both sides of the knob bore 100 so that the width 162 is larger than the knob head diameter 48. The panel 12 can then be pulled from the latch 14.

As a safety mechanism, both squeeze edges 126, 146 must be squeezed together. If only one squeeze edge 126, 146 is squeezed, only one hook 124, 144 moves, leaving the other hook 124, 144 to retain the knob 28.

Figure 20:
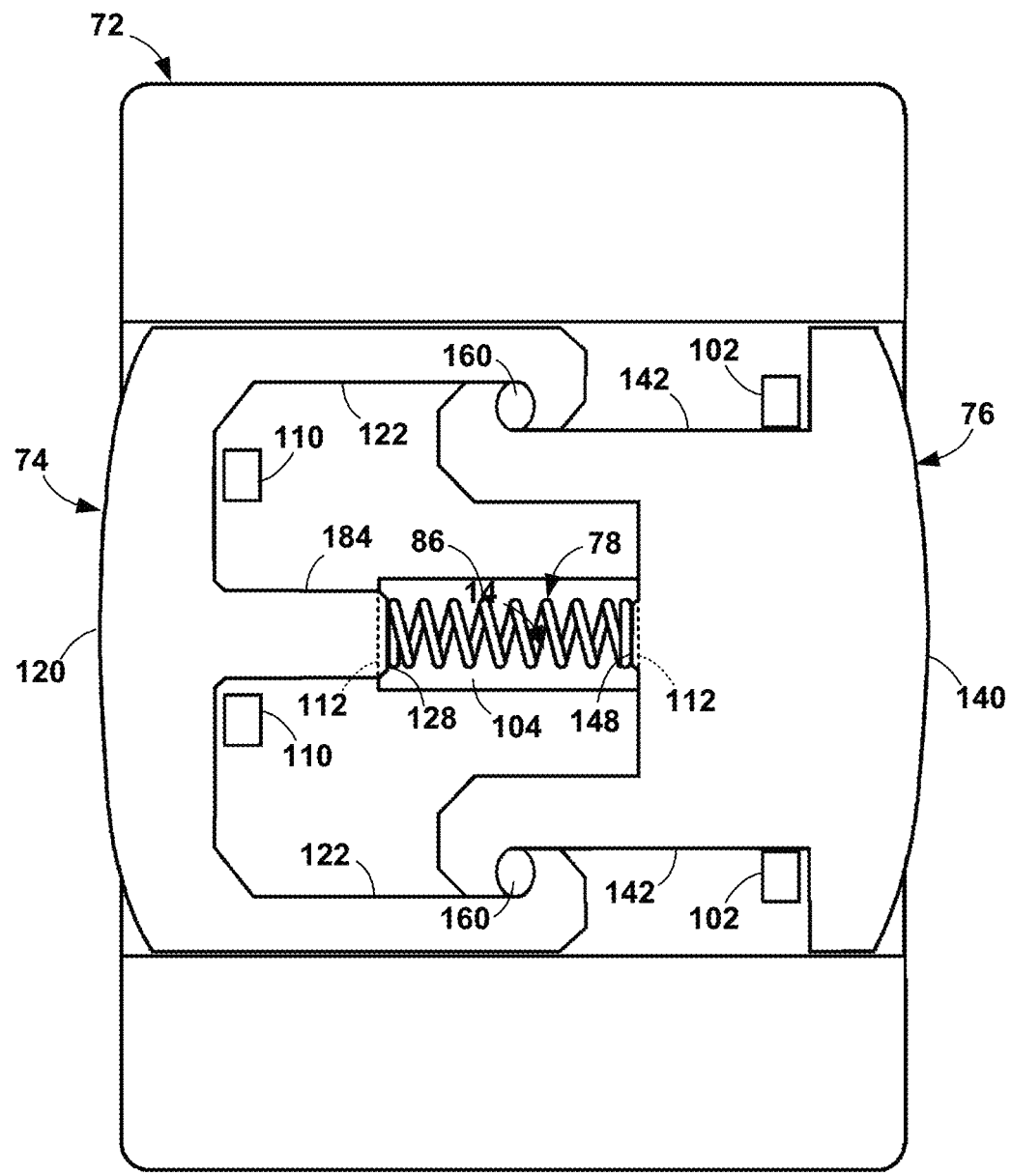
FIG. 20 is a front view of an elongated configuration of the latch without the cover in the latched position.

The device of the present invention can be made wider by lengthening the slider arms 122, 142, as in FIG. 17. Because the ends of the slider arms 122, 142 are farther away from the slider stops 102, additional stops 110 for the first slider 74 can be employed, shown in FIG. 20 in two different locations. Alternatively, the slider stops 102 can be elongated in the X direction.

Figure 21:
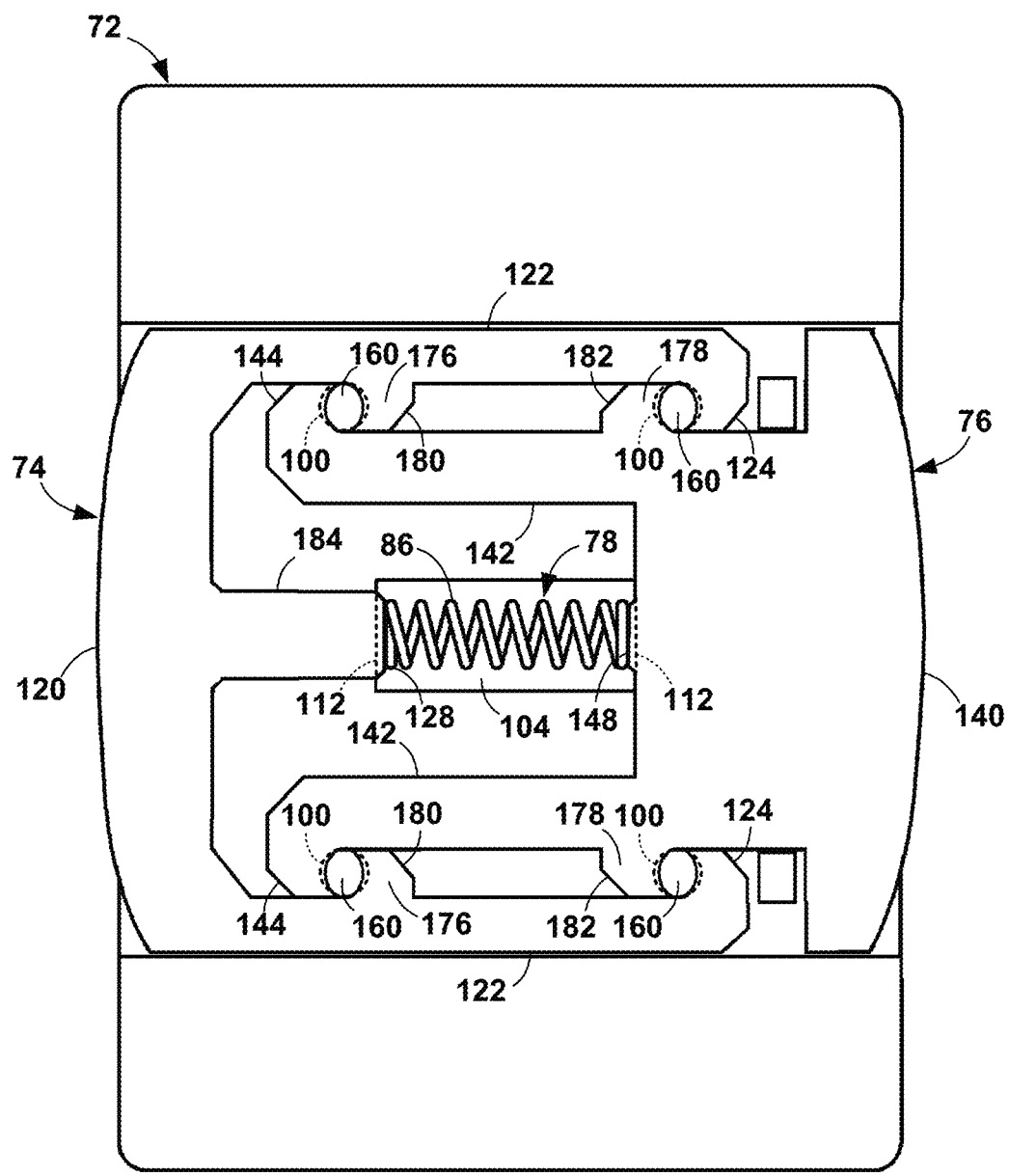
FIG. 21 is a front view of a configuration of the latch with two rows of two apertures and without the cover in the latched position.

The device of the present invention can be made with two or more holes in the X-direction, as in FIG. 21. Each arm 122 of the first slider 74 has a first finger 176 forming a first center hook 180 between the first center bar 120 and the first end hook 124. Each arm 142 of the second slider 76 has a second finger 178 forming a second center hook 182 between the second center bar 140 and the second end hook 144. One aperture 160 is formed by the first end hook 124 and the second center hook 182. Another aperture 160 is formed by the second end hook 144 and the first center hook 180.

Figure 22:
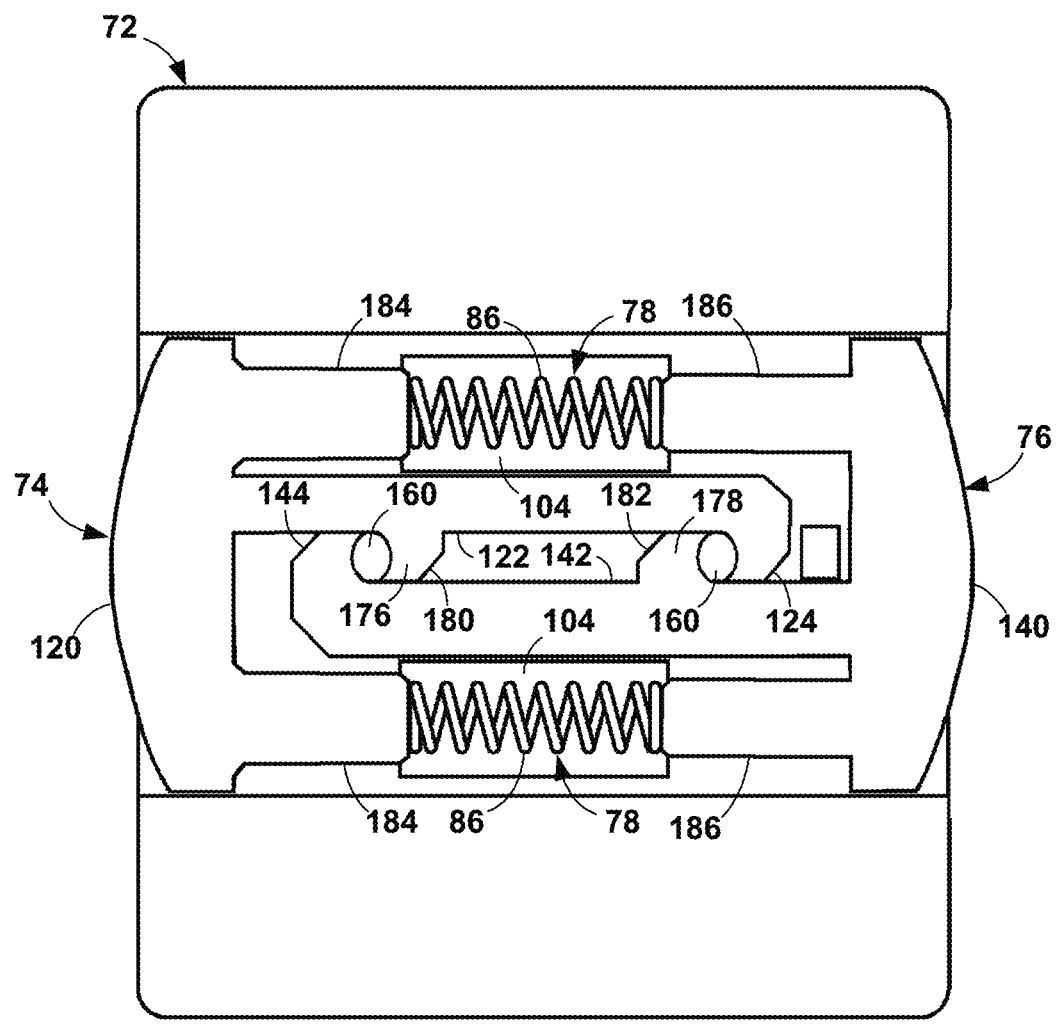
FIG. 22 is a front view of a configuration of the latch with a single row of two apertures and without the cover in the latched position.

The device of the present invention can be made with holes only in the X-direction, as in FIG. 22. The sliders 74, 76 are mirror images. The first slider 74 has a single arm 122 with a first end hook 124 and a first finger 176 forming a first center hook 180 between the first center bar 120 and the first end hook 124. The second slider 76 has a single arm 142 with a second end hook 144 and a second finger 178 forming a second center hook 182 between the second center bar 140 and the second end hook 144. One aperture 160 is formed by the first end hook 124 and the second center hook 182. Another aperture 160 is formed by the second end hook 144 and the first center hook 180. For balance, a pair of springs 86 straddle the arms 122, 142.

In order to maintain the same squeeze pressure throughout the various versions of the latch 14, the spring 86 is kept the same length. For the wider versions of FIGS. 20 and 21, the outer spring wall 128 is at the end of a spring wall extension 184 that extends inwardly from the center bar 120 and the inner wall center bar 140 is wider. For the wider version of FIG. 22, the outer spring walls 128, 148 are at the end of spring wall extensions 184, 186 that extend inwardly from the center bar 120, 140. The spring slot 104 is also the same length throughout the various versions so that the spring slot ends 112 are the same distance apart.

Figure 23:
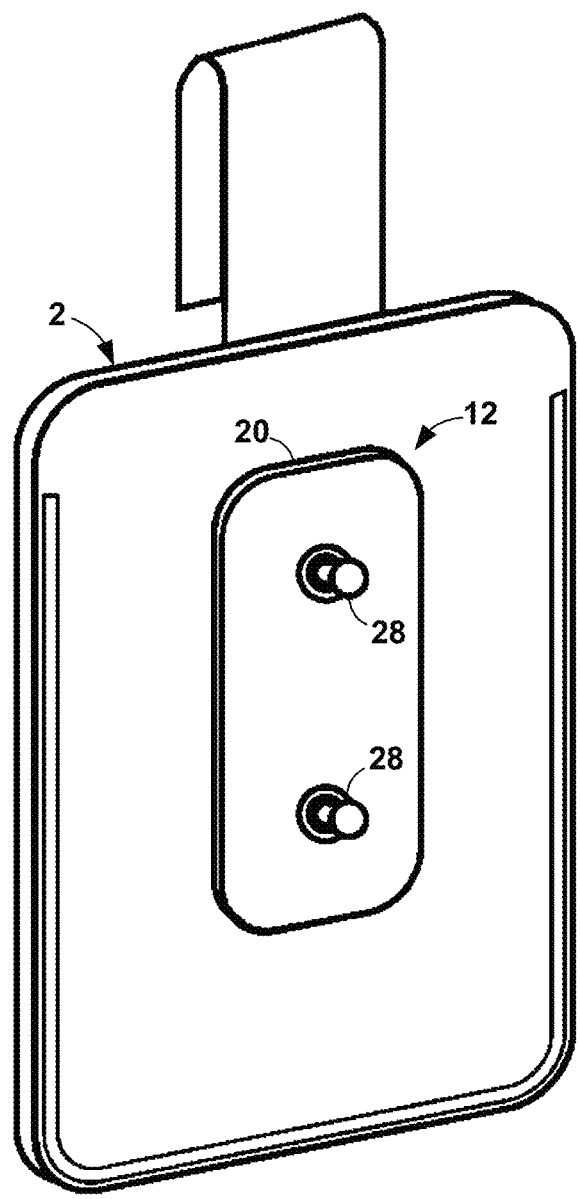
FIG. 23 is an isometric view of a panel with two vertical knobs.
Figure 24:
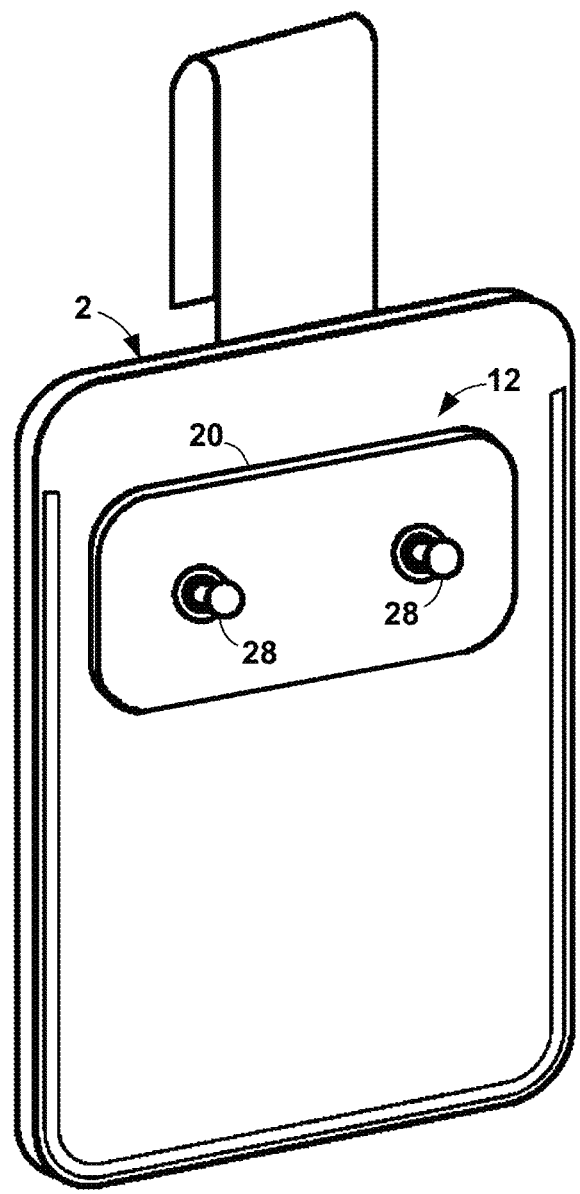
FIG. 24 is an isometric view of a panel with two horizontal knobs.
Figure 25:
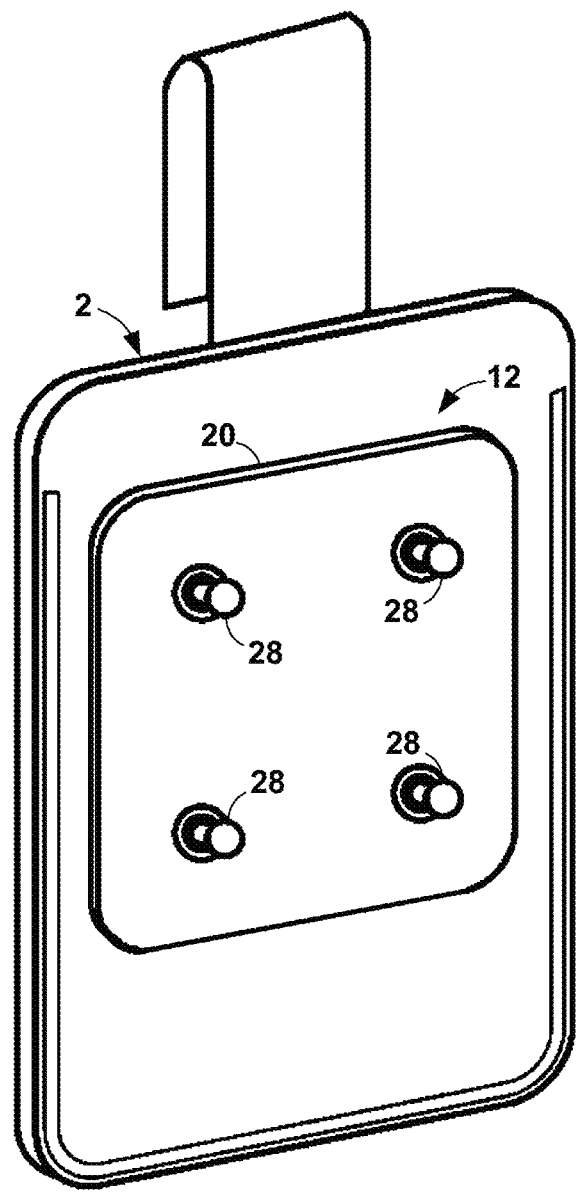
FIG. 25 is an isometric view of a panel with four knobs in a rectangular arrangement.

The panel 12 attaches to items of gear 2 such as holsters, cuff cases, radio holders, and other pouches that are to be attached to the duty belt or other carrier. The panel 12 can have any number of knobs 28, the number of which will depend on the weight and size of the item 2. For example, a light and/or narrow item 2, such as a flashlight pouch, can have a mount with two vertical knobs 28, as in FIG. 23. A light/wide item 2, such as a handcuff pouch, can have a mount with two horizontal knobs 28, as in FIG. 24. A heavy/wide item 2, such as a dual mag pouch, gun holster, radio pouch, and Taser holster, can have a mount with four knobs 28 arranged in a rectangle, as in FIG. 25. The four-knob panel 12 can be used for greater security of lethal and less lethal weapons, as well as heavier, more expensive items, like a radio.

The plate 20 of the panel 12 can be riveted, stitched, screwed, or otherwise attached to the gear item 2. Alternatively, the knobs 28 can be produced integrally with the gear item 2. For example, if the back surface of the gear item 2 is rigid, such as a badge, the knobs 28 can be formed with or attached directly to the item 2, as in FIG. 27.

Figure 26:
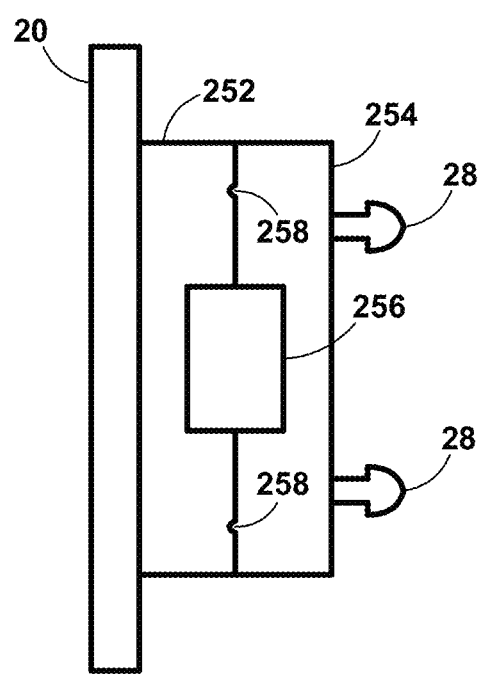
FIG. 26 is a side, cross-sectional view of a swivel.

Optionally, the panel 12 can have a swivel 250 between the plate 20/item 2 and the knobs 28. As shown in the cross-section of FIG. 26, the swivel 250 has a base 252 that is attached to the gear item 2 or plate 20 and a rotator 254 from which the knobs 28 extend. The base 252 and rotator 254 are attached together by an axle 265 on which the rotator 254 rotates. Optionally, the swivel 250 includes detents 258 to retain the rotator 256 at desired angles. For example, the swivel 250 has detents to retain the rotator 256 at 0°, 45°, and 90°. The swivel 250 is useful when it is desired to rotate the gear item out of the way in certain situations. For example, when driving, the swivel 250 permits the user to rotate a flashlight pouch forward so it does not interfere with sitting.

As mentioned above, the latch 14 attaches to a carrier 4 and the present invention contemplates several different methods of doing so. In one method, the latch 14 is attached to the carrier 4 by the panel 12. For example, if the carrier 4 is a shirt, the latch 14 is inside the shirt and the panel 12 is outside the shirt, as in FIG. 27. The knobs 28 are typically conical and are pushed through the shirt fabric 4 to attach to the latch 14.

Figure 32:
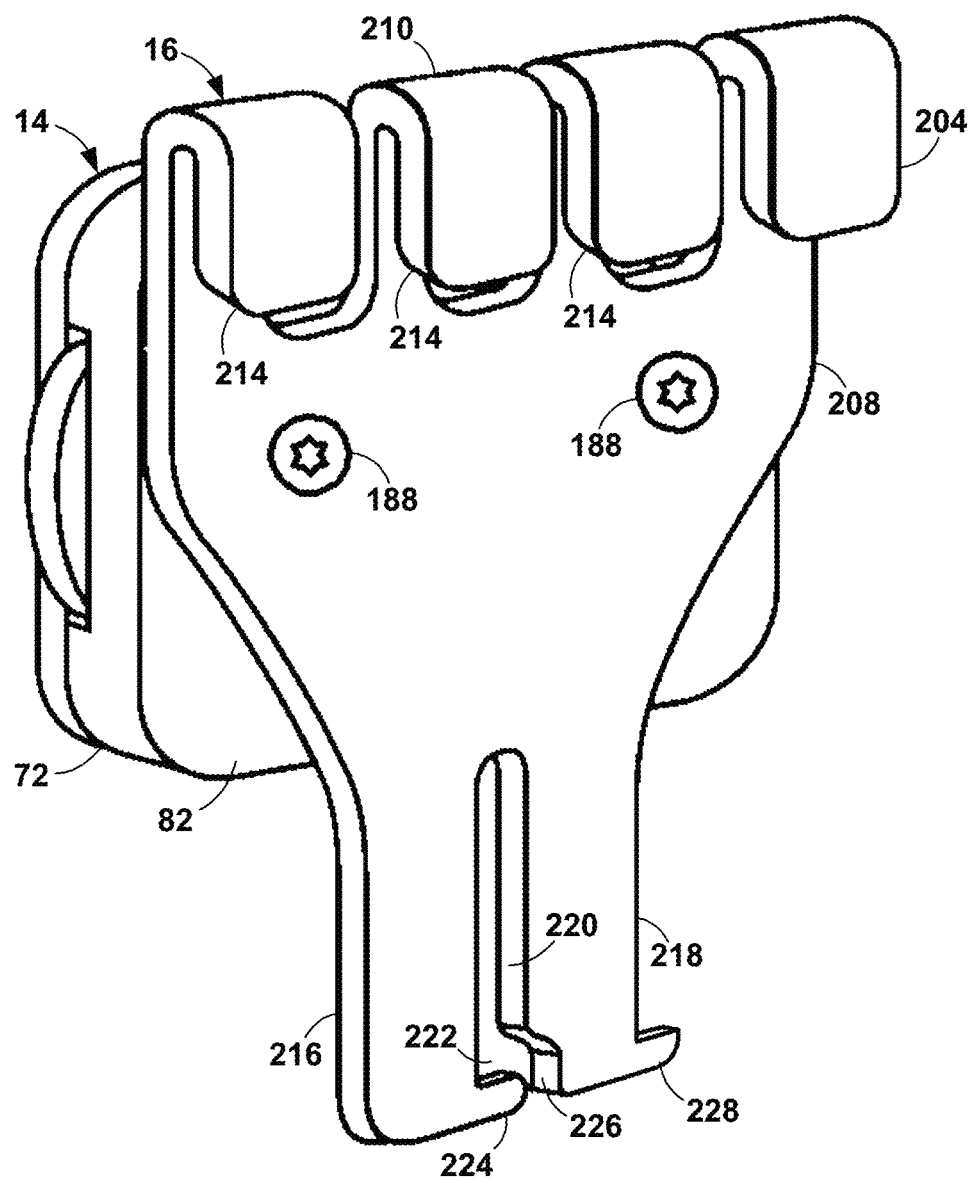
FIG. 32 is an isometric view of a latch with a carrier adapter for attachment to a MOLLE-equipped carrier.

Alternatively, a carrier adapter 16 attached to the latch 14 adapts the latch 14 to a carrier 4. There are several forms of carrier adapters 16, each designed for attaching to a different type of carrier 4. The carrier adapter 16 can be integrated with the latch 14. Alternatively, the carrier adapter 16 can be removably attached to the latch 14 by, for example, screws 188, as seen in FIGS. 29 and 32.

Figure 28:
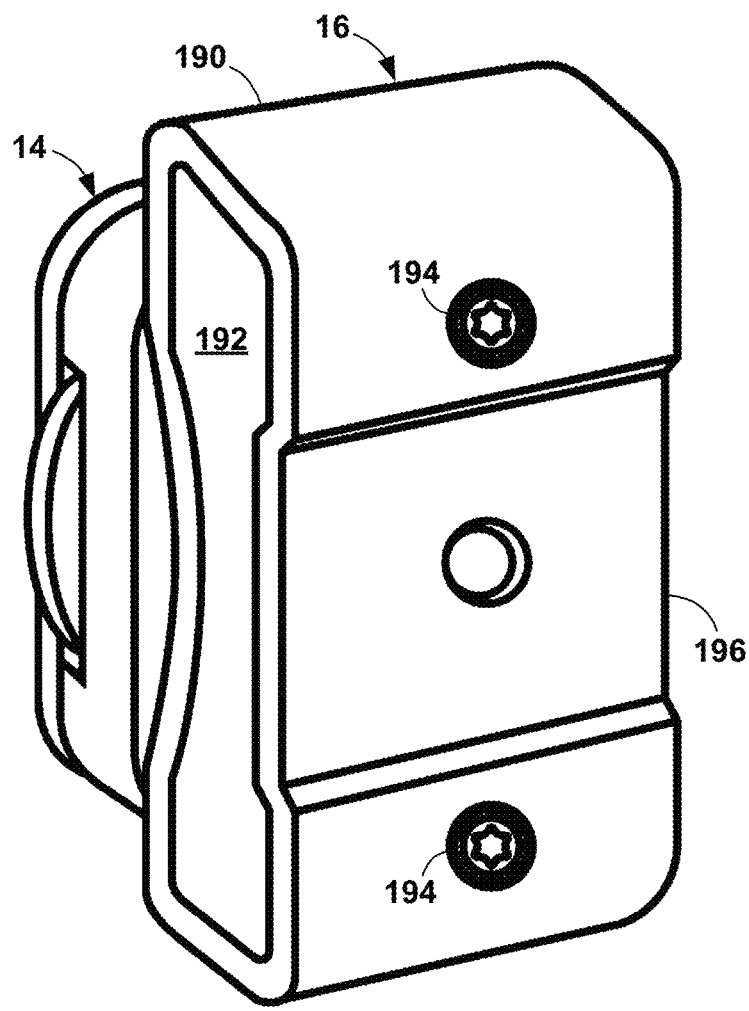
FIG. 28 is an isometric view of a latch with a carrier adapter for attachment to a duty belt.
Figure 29:
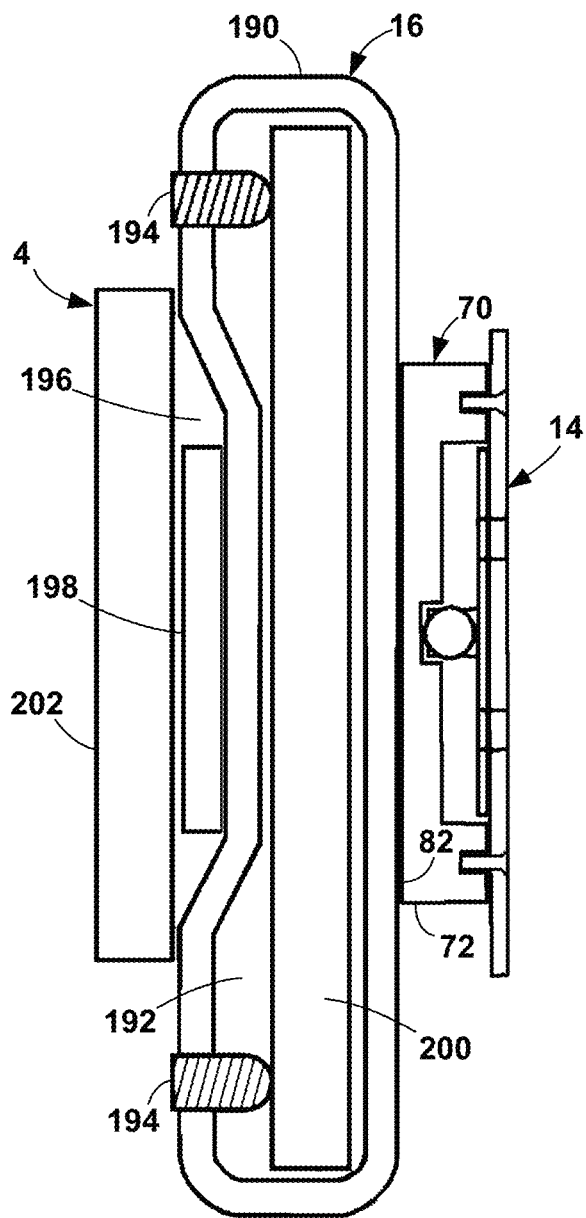
FIG. 29 is a cross-sectional side view of the latch attached to a duty belt.

A carrier adapter 16 for attaching the latch 14 to a duty belt is shown in FIGS. 28 and 29. A belt channel 192 is formed in a rectangular tube 190 that is attached to the back 82 of the latch frame 72. Alternatively, the back 82 of the latch frame 72 is one side of the tube 190. The belt channel 192 is slid onto the duty belt 200 and secured in the desired position by one or more set screws 194. The duty belt carrier adapter 16 can be narrow for a single-wide latch 14 or wide for double-wide latch 14.

As described above, a duty belt 200 is typically used with a narrower microloop/microhook keeper belt 202. At the locations where the latch 14 is on the duty belt 200, the duty belt 200 does not secure to the microloop/microhook keeper belt 202. Optionally, the latch 14 includes a microloop/microhook fastener strip 198 that attaches to the keeper belt 202 for a more secure attachment. Optionally, microloop/microhook fastener strip 198 is within a shallow, horizontal groove 196.

Figure 30:
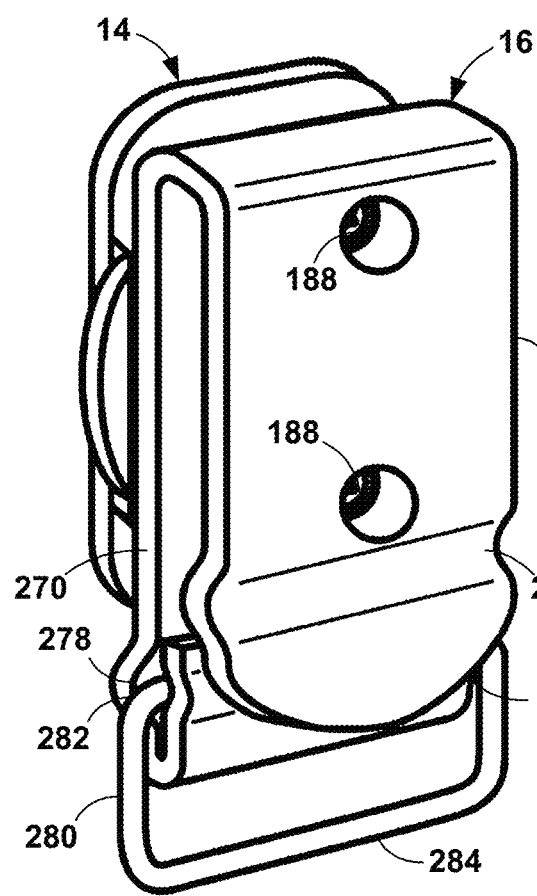
FIG. 30 is an isometric view of a latch with a carrier adapter for clipping onto a duty belt in the open position.
Figure 31:
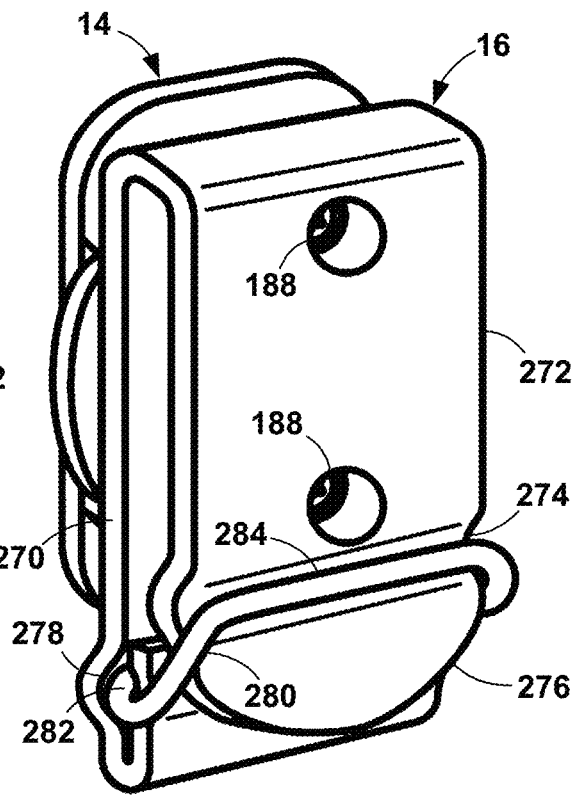
FIG. 31 is an isometric view of a latch with a carrier adapter for clipping onto a duty belt in the closed position.

Another carrier adapter 16 for attaching the latch 14 to a duty belt is shown in FIGS. 30 and 31. This carrier adapter 16 is designed to securely clip onto to a duty belt without having to remove the duty belt. The top of the carrier adapter body 270 is bent approximately 180° toward the body 270 to form a clip 272. The outside of the clip 242 has a lateral depression 274 near the free end 276. The bottom of the body 270 bends upwardly 180° to form a horizontal pivot channel 278. One horizontal side 282 of a rectangular wire hasp 280 is captured in and freely pivots horizontally within the channel 278, as shown in FIG. 30. The wire hasp 280 is sized such that, when it is pivoted upwardly, the free horizontal side 284 of the hasp 280 snaps into the lateral depression 274 in the clip 272, as in FIG. 32.

Figure 33:
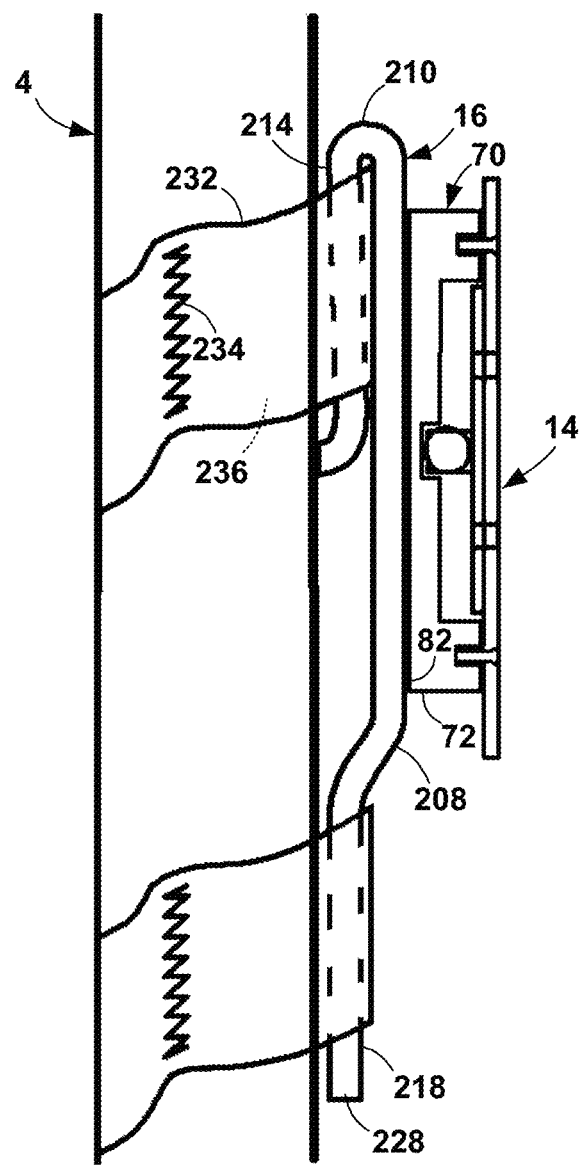
FIG. 33 is a cross-sectional side view of the latch attached to a MOLLE-equipped carrier.
Figure 34:
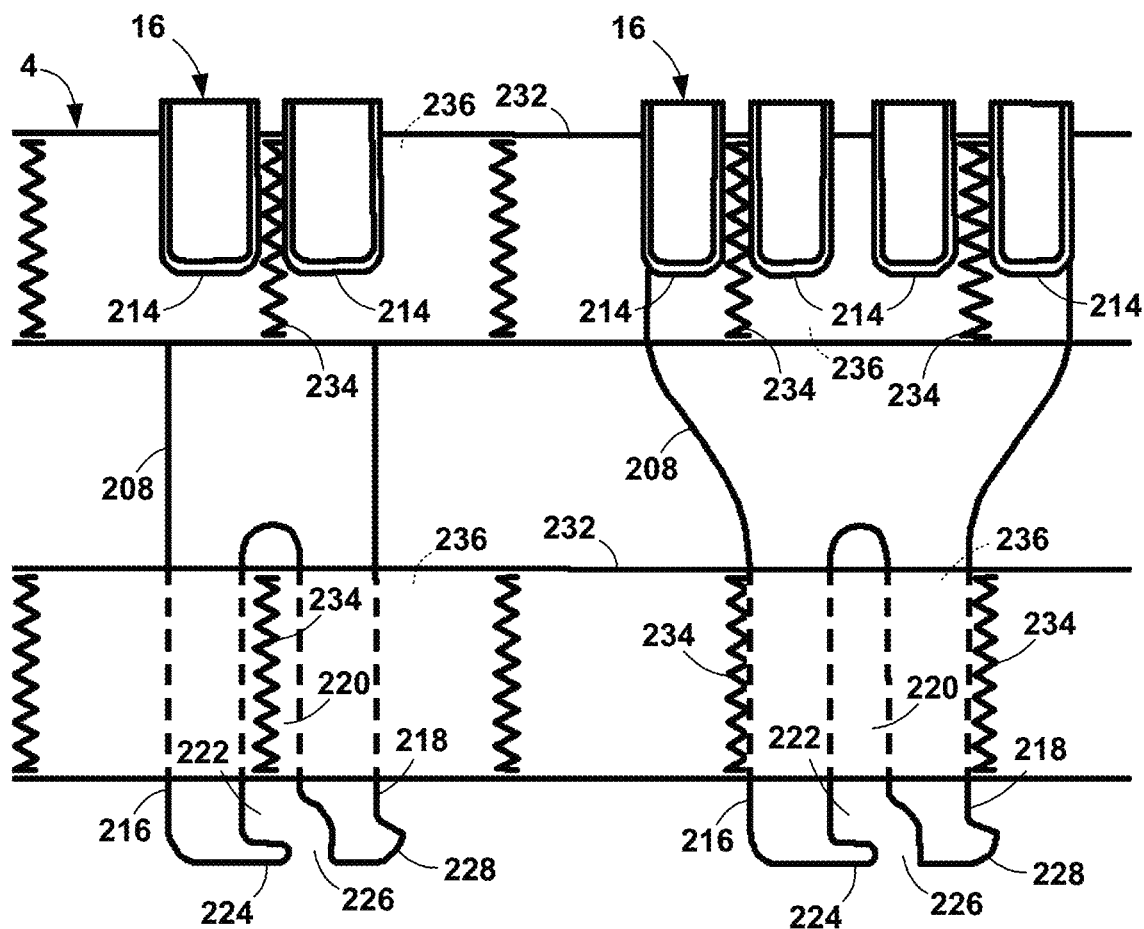
FIG. 34 is a partial phantom back view of the latch attached to a MOLLE-equipped carrier.

A carrier adapter 16 for attaching to a MOLLE-equipped carrier is shown in FIGS. 32-34. The top edge 210 of the body 208 has one or more hooks 214 that hook into the MOLLE loops 236 and are space apart appropriately. A pair of tabs 216, 218 extend downwardly from the body 208, separated by a vertical slot 220. The slot 220 has a bend 222 that forms a horizontal finger 224 in one tab 216 and a corresponding notch 228 in the other tab 218. Optionally, the notched tab 218 has a hook 228 opposite the notch 226.

As seen in FIG. 34, the MOLLE carrier adapter 16 can be narrow for a single-wide latch 14 or wide for a double-wide latch 14. Shown with the single-wide carrier adapter 16 in FIG. 34, the tabs 216, 218 can straddle the stitching 234 in the MOLLE strips 232 that separates the MOLLE loops 236, with the finger 222 hooking under the stitching 234. Shown with the double-wide carrier adapter 16 in FIG. 34, both tabs 216, 218 can fit into the same MOLLE loop 236, with the hook 228 under one of the stitchings 234.

Figure 35:
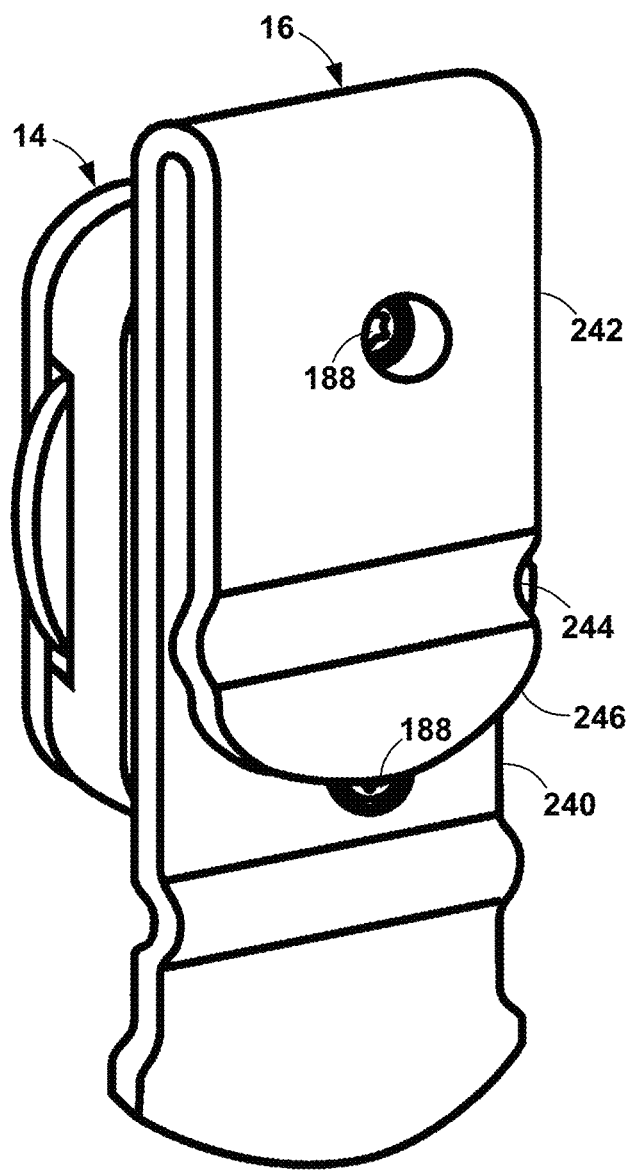
FIG. 35 is an isometric view of a latch with a carrier adapter for attachment to a horizontal slot.

A carrier adapter 16 for attaching to a horizontal slot is shown in FIG. 35. The top of the carrier adapter body 240 is bent greater than 180° toward the body 240 to form a clip 242. Optionally, the clip 242 has a bulge 244 near the free end 246 that makes contact with the body 240. The clip 244 slides into the slot, such as a pocket or other horizontal opening, and is held there by the clip 244.

The latch 14 is typically composed of stainless steel, aluminum, other metal alloy, or molded plastic with metal inner parts. The carrier adapter 16 is typically composed of stainless steel, aluminum, other metal alloy, or molded plastic.

Thus it has been shown and described a gear attachment system. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. An apparatus for attaching an item of gear to a duty belt, the apparatus comprising:
   (a) a knob having a neck adapted to attach to the item of gear, and a head extending from the neck, the neck having a diameter and the head having a diameter larger than the neck diameter;
   (b) a latch having a frame, a first slider, a second slider, and a biasing mechanism, the frame having a front side and back side;
   (c) the frame having a knob bore in the front side;
   (d) the first slider having a first center bar, a first squeeze edge on the first center bar, a first at least one arm extending perpendicularly from a first inner edge of the first center bar opposite the first squeeze edge to a first hook, the first hook curving between approximately 90° and approximately 180° back toward the first center bar to form a first concave edge;
   (e) the second slider having a second center bar, a second squeeze edge on the second center bar, a second at least one arm extending perpendicularly from a second inner edge of the second center bar opposite the second squeeze edge to a second hook, the second hook curving between approximately 90° and approximately 180° back toward the second center bar to form a second concave edge;
   (f) the sliders slidably mounted within a slider depression in the front side of the frame such that the first concave edge and the second concave edge form an aperture aligned with the knob bore, the aperture having a width and a height, the height being larger than the knob head diameter;
   (g) the biasing mechanism biasing the first slider and the second slider away from each other such that the latch is in a latched position wherein the aperture width is smaller than the knob head diameter;
   (h) when the first slider and the second slider are forced toward each other against the biasing mechanism, the latch is in an unlatched position wherein the aperture width is larger than the knob head diameter;

(i) a rectangular tube on the back side of the frame, the tube having a belt channel adapted to receive a duty belt; and
(j) at least one set screw extending into the belt channel and adapted to secure the latch to the duty belt;
(k) whereby, when the latch is in the unlatched position, the knob is removably receivable by the aperture, and when the latch is in the latched position, the knob is captured by the aperture.

2. The apparatus of claim 1 wherein the rectangular tube is removably attached to the frame.

3. The apparatus of claim 1 further comprising a microloop/microhook fastener strip on an outside wall of the rectangular tube opposite the frame.

4. The apparatus of claim 3 wherein the fastener strip is in a shallow groove in the outside wall of the rectangular tube.

5. The apparatus of claim 1 further comprising a panel adapted to attach to the item of gear and having a rigid plate with a front surface, the knob neck attached to the panel such that the knob extends perpendicularly from the front surface.

6. The apparatus of claim 5 wherein the plate and knob are integral.

7. The apparatus of claim 5 wherein the plate and knob are produced independently, and the knob neck is attached to the plate.

8. The apparatus of claim 1 further comprising a swivel adapted to attach to the item of gear and wherein the knob neck is attached to the swivel.

9. The apparatus of claim 1 wherein the frame has a cover attached to the front side and with holes aligned with the aperture through which the knob extends.

10. The apparatus of claim 1 wherein the biasing mechanism is at least one coil spring between the first slider center bar and the second slider center bar.

11. The apparatus of claim 1 wherein the frame has slider stops that limit slider travel.

12. The apparatus of claim 1 wherein the first at least one arm is two arms and the second at least one arm is two arms.

13. An apparatus for attaching an item of gear to a duty belt, the apparatus comprising:
(a) a plurality of knobs, each knob having a neck adapted to attach to the item of gear, and a head extending from the neck, the neck having a diameter and the head having a diameter larger than the neck diameter;
(b) a latch having a frame, a first slider, a second slider, and a biasing mechanism, the frame having a front side and back side;
(c) the frame having a knob bore in the front side for each knob;
(d) the first slider having a first center bar, a first squeeze edge on the first center bar, a first at least one arm extending perpendicularly from a first inner edge of the first center bar opposite the first squeeze edge to a first hook, the first hook curving between approximately 90° and approximately 180° back toward the first center bar to form a first concave edge, a first center hook on the first arm between the first center bar and the first hook, the first center hook curving between approximately 90° and approximately 180° back toward the first center bar to form a first center concave edge;
(e) the second slider having a second center bar, a second squeeze edge on the second center bar, a second at least one arm extending perpendicularly from a second inner edge of the second center bar opposite the second squeeze edge to a second hook, the second hook curving between approximately 90° and approximately 180° back toward the second center bar to form a second concave edge, a second center hook on the second arm between the second center bar and the second hook, the second center hook curving between approximately 90° and approximately 180° back toward the second center bar to form a second center concave edge;
(f) the sliders slidably mounted within a slider depression in the front side of the frame such that the first concave edge and the second center concave edge form a first aperture and the second concave edge and the first center concave edge form a second aperture, each aperture aligned with a knob bore, each aperture having a width and a height, the height being larger than the knob head diameter;
(g) the biasing mechanism biasing the first slider and the second slider away from each other such that the latch is in a latched position wherein the aperture width is smaller than the knob head diameter;
(h) when the first slider and the second slider are forced toward each other against the biasing mechanism, the latch is in an unlatched position wherein the aperture width is larger than the knob head diameter;
(i) a belt channel on the back side of the frame and adapted to receive a duty belt; and
(j) at least one set screw extending into the belt channel and adapted to secure the latch to the duty belt;
(k) whereby, when the latch is in the unlatched position, each knob is removably receivable by one aperture, and when the latch is in the latched position, the knob is captured by the aperture.

14. The apparatus of claim 13 wherein the rectangular tube is removably attached to the frame.

15. The apparatus of claim 13 further comprising a microloop/microhook fastener strip on an outside wall of the rectangular tube opposite the frame.

16. The apparatus of claim 15 wherein the fastener strip is in a shallow groove in the outside wall of the rectangular tube.

17. The apparatus of claim 13 further comprising a panel; adapted to attach to the item of gear and having a rigid plate with a front surface, the knob necks attached to the panel such that the knobs extend perpendicularly from the front surface.

18. The apparatus of claim 17 wherein the plate and knobs are integral.

19. The apparatus of claim 17 wherein the plate and knobs are produced independently, and the knobs are attached to the plate.

20. The apparatus of claim 13 further comprising a swivel adapted to attach to the item of gear and wherein the knob necks are attached to the swivel.

21. The apparatus of claim 13 wherein the frame has a cover attached to the front side and with holes aligned with the apertures through which the knobs extend.

22. The apparatus of claim 13 wherein the biasing mechanism is at least one coil spring between the first slider center bar and the second slider center bar.

23. The apparatus of claim 13 wherein the frame has slider stops that limit slider travel.

24. The apparatus of claim 13 wherein the first at least one arm is two arms and the second at least one arm is two arms.

* * * * *